US010560235B2

(12) United States Patent
Chen et al.

(10) Patent No.: US 10,560,235 B2
(45) Date of Patent: Feb. 11, 2020

(54) NARROWBAND CONTROL CHANNEL DECODING

(71) Applicant: QUALCOMM Incorporated, San Diego, CA (US)

(72) Inventors: Wanshi Chen, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/927,210

(22) Filed: Oct. 29, 2015

(65) Prior Publication Data

US 2016/0127097 A1 May 5, 2016

Related U.S. Application Data

(60) Provisional application No. 62/074,535, filed on Nov. 3, 2014, provisional application No. 62/073,923, filed on Oct. 31, 2014.

(51) Int. Cl.
*H04L 5/00* (2006.01)
*H04L 27/26* (2006.01)

(52) U.S. Cl.
CPC .......... *H04L 5/0048* (2013.01); *H04L 5/0005* (2013.01); *H04L 5/0051* (2013.01); *H04L 27/2649* (2013.01)

(58) Field of Classification Search
CPC combination set(s) only.
See application file for complete search history.

(56) References Cited

U.S. PATENT DOCUMENTS

| 4,713,806 A * | 12/1987 | Oberlander ........ H04Q 11/0407 370/358 |
| 2010/0159973 A1 * | 6/2010 | Thomas ................ H04W 76/45 455/509 |

(Continued)

FOREIGN PATENT DOCUMENTS

| CN | 104956749 A | 9/2015 |
| CN | 105075144 A | 11/2015 |

(Continued)

OTHER PUBLICATIONS

Dahlman et al., "Chapter 10: Downlink Physical-Layer Processing," 4G LTE/LTE-Advanced for Mobile Broadband, Mar. 29, 2011, 61 pgs., XP_55046016A, Elsevier.

(Continued)

*Primary Examiner* — Yee F Lam
(74) *Attorney, Agent, or Firm* — Holland & Hart LLP

(57) ABSTRACT

Methods, systems, and devices for wireless communication are described. A user equipment (UE) may establish a connection with another wireless node, such as a base station or another UE. The connection may include a narrowband control region of a wideband system. The UE may identify a set of resources, which may include a set of subframes that have the same precoding or a set of resource blocks that have the same precoding, during which to monitor a demodulation reference signal (DM-RS) for decoding a control channel within the narrowband. The UE may then decode the control channel using the DM-RS or a cell-specific reference signal (CRS), or both DM-RS and CRS. The UE may exclude resources of the narrowband region that include a control region for broadband communications.

27 Claims, 23 Drawing Sheets

(56) References Cited

U.S. PATENT DOCUMENTS

| | | | |
|---|---|---|---|
| 2012/0281555 A1 | 11/2012 | Gao et al. | |
| 2013/0114495 A1* | 5/2013 | Chen | H04L 1/0004 370/312 |
| 2013/0121276 A1 | 5/2013 | Kim et al. | |
| 2013/0194931 A1* | 8/2013 | Lee | H04L 5/0053 370/241 |
| 2013/0195043 A1 | 8/2013 | Chen et al. | |
| 2014/0169325 A1 | 6/2014 | Ratasuk et al. | |
| 2014/0243002 A1 | 8/2014 | Muruganathan et al. | |
| 2015/0304998 A1* | 10/2015 | Horiuchi | H04W 72/0446 370/329 |
| 2015/0333880 A1* | 11/2015 | Yi | H04L 5/001 370/329 |
| 2019/0021081 A1* | 1/2019 | Ljung | H04W 16/14 |

FOREIGN PATENT DOCUMENTS

| | | | |
|---|---|---|---|
| DE | 112011105506 B4 | 6/2019 | |
| JP | 2016518758 A | 6/2016 | |
| KR | 20140036927 A | 3/2014 | |
| WO | WO-2013112960 A1 | 8/2013 | |
| WO | WO 2013129884 A1 * | 9/2013 | ............. H04L 5/001 |
| WO | WO-2014046425 A2 | 3/2014 | |
| WO | WO-2014117326 A1 * | 8/2014 | ........ H04W 72/0446 |
| WO | WO-2014161141 A1 | 10/2014 | |

OTHER PUBLICATIONS

ISA/EPO, International Search Report and Written Opinion of the International Searching Authority, Int'l App. No. PCT/US2015/058271, dated Feb. 1, 2016, European Patent Office, Rijswijk, NL, 12 pgs.

Ericsson: "WF on Physical Downlink Control Channel for MTC", R1-144501, 3GPP TSG RAN WG1 #78bis, Ljubljana, Slovenia, Oct. 6-10, 2014, Oct. 9, 2014, 2 Pages.

Qualcomm Incorporated: "Other Physical Channels and Signals", R1-143997, 3GPP TSG RAN WG1 #78bis, Oct. 6-10, 2014, Ljubljana, Slovenia, Oct. 6, 2014, 4 Pages, URL:http://www.3gpp.org/ftp/tsg_ran/WG1_RL1/TSGR1_78b/Docs/R1-143997.zip . . . .

* cited by examiner

| Tone Index | Symbol Index | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | | | | 12 | | 0 | 12 | | | 9 | 10 | 11 | 12 | 13 |
| 1 | 0 | 8 | 0 | 13 | 8 | 1 | 13 | 8 | 0 | 8 | 4 | 0 | 8 | 4 |
| 2 | 1 | 9 | 1 | 14 | 9 | 2 | 14 | 9 | 1 | 9 | 5 | 1 | 9 | 5 |
| 3 | | | 2 | 15 | | 3 | 15 | | | 10 | 6 | | | 6 |
| 4 | 2 | 10 | 3 | 0 | 10 | 4 | 0 | 10 | 2 | 11 | 7 | 2 | 10 | 7 |
| 5 | 3 | 11 | 4 | 1 | 11 | 5 | 1 | 11 | 3 | 12 | 8 | 3 | 11 | 8 |
| 6 | | | 5 | 2 | | 6 | 2 | | | 13 | 9 | | | 9 |
| 7 | 4 | 12 | 6 | 3 | 12 | 7 | 3 | 12 | 4 | 14 | 10 | 4 | 12 | 10 |
| 8 | 5 | 13 | 7 | 4 | 13 | 8 | 4 | 13 | 5 | 15 | 11 | 5 | 13 | 11 |
| 9 | | | 8 | 5 | | 9 | 5 | | | 0 | 12 | | 14 | 12 |
| 10 | 6 | 14 | 9 | 6 | 14 | 10 | 6 | 14 | 6 | 2 | 13 | 6 | 14 | 13 |
| 11 | 7 | 15 | 10 | 7 | 15 | 11 | 7 | 15 | 7 | 3 | 14 | 7 | 15 | 14 |

305-a, 310

CRS REs

Indexed Control Region REs

NARROWBAND CONTROL CHANNEL DECODING

CROSS REFERENCES

The present application for patent claims priority to U.S. Provisional Patent Application No. 62/073,923 by Chen et al., entitled "CRS Based Control Channel Element," filed Oct. 31, 2014 and U.S. Provisional Patent Application No. 62/074,535 by Chen et al., entitled "CRS Based Control Channel Element," filed Nov. 3, 2014, assigned to the assignee hereof, and expressly incorporated by reference herein.

BACKGROUND

Field of Disclosure

The following relates generally to wireless communication and more specifically to narrowband control channel decoding.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., an LTE system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

In some cases, certain UEs may have limited operating capabilities. For example, device UE may not be designed for broadband communications. This may interfere with the ability of the UE to receive certain control information from a base station.

SUMMARY

Systems, methods, and apparatuses for a narrowband control channel decoding are described. A user equipment (UE) may establish a connection with another wireless node, such as a base station or UE. The connection may include a narrowband control region of a wideband system. The UE may identify a set of subframes during which to monitor a demodulation reference signal (DM-RS) for decoding a control channel. The identified subframes or resource blocks may, for example, have the same precoding. The UE may decode the control channel (e.g., a physical downlink control channel (PDCCH)) using the DM-RS. In some examples, the UE may additionally or alternatively decode the control channel using a cell-specific reference signal (CRS). The UE may, in some examples, determine—e.g., via signaling received from another node—resources to exclude from the control channel. For instance, the UE may determine that the narrowband region includes a portion of control region for broadband communication, and the UE may exclude those resources.

A method of wireless communication is described. The method may include identifying a plurality of subframes during which to monitor a demodulation reference signal (DM-RS) for decoding a control channel associated with a node, wherein the control channel comprises a narrowband region of a wideband system, and wherein the plurality of subframes have a same precoding for the DM-RS and decoding the control channel based at least in part on the DM-RS.

An apparatus for wireless communication is described. The apparatus may include means for identifying a plurality of subframes during which to monitor a demodulation reference signal (DM-RS) for decoding a control channel associated with a node, wherein the control channel comprises a narrowband region of a wideband system, and wherein the plurality of subframes have a same precoding for the DM-RS and means for decoding the control channel based at least in part on the DM-RS.

A further apparatus is described. The apparatus may include a processor, memory in electronic communication with the processor, and instructions stored in the memory. The instructions may be operable, when executed by the processor, to cause the apparatus to identify a plurality of subframes during which to monitor a demodulation reference signal (DM-RS) for decoding a control channel associated with a node, wherein the control channel comprises a narrowband region of a wideband system, and wherein the plurality of subframes have a same precoding for the DM-RS and decode the control channel based at least in part on the DM-RS.

A non-transitory computer readable medium for wireless communication is described. The non-transitory computer-readable medium may store code for wireless communication, and the code may include instructions executable to identify a plurality of subframes during which to monitor a demodulation reference signal (DM-RS) for decoding a control channel associated with a node, where the control channel comprises a narrowband region of a wideband system, and where the plurality of subframes have a same precoding for the DM-RS and decode the control channel based at least in part on the DM-RS.

Some examples of the method, apparatus, or non-transitory computer-readable medium described above may further include processes, features, means, or instructions for identifying two or more resource blocks (RBs) that have the same precoding within the narrowband region.

Some examples of the method, apparatus, or non-transitory computer-readable medium described above may further include processes, features, means, or instructions for excluding resources of the narrowband region that comprise a control region for broadband communications from the control channel.

Some examples of the method, apparatus, or non-transitory computer-readable medium described above may further include processes, features, means, or instructions for receiving a message indicating the resources of the narrowband region that comprise the control region for broadband communications. Some examples of the method, apparatus, or non-transitory computer-readable medium described above may further include processes, features, means, or instructions for determining the resources of the narrowband region that comprise the control region for the broadband communications based at least in part on the message.

In some examples of the method, apparatus, or non-transitory computer-readable medium described above, the control channel comprises a control channel element (CCE) that comprises a set of resource element groups (REGs).

In some examples of the method, apparatus, or non-transitory computer-readable medium described above, each REG of the set of REGs is distributed in time and frequency during the plurality of subframes within the narrowband region.

In some examples of the method, apparatus, or non-transitory computer-readable medium described above, each REG of the set of REGs excludes resource elements that comprise DM-RS.

In some examples of the method, apparatus, or non-transitory computer-readable medium described above, each REG of the set of REGs excludes resource elements that comprise a cell-specific reference signal (CRS).

In some examples of the method, apparatus, or non-transitory computer-readable medium described above, a single precoder is applied for each physical resource block pair of the control channel.

In some examples of the method, apparatus, or non-transitory computer-readable medium described above, two or more precoders are applied to resources with each physical resource block pair of the control channel.

In some examples of the method, apparatus, or non-transitory computer-readable medium described above, the control channel is decoded based at least in part on a cell-specific reference signal (CRS).

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3C illustrates an example an indexing configuration pair for narrowband control channel decoding in accordance with various aspects of the present disclosure;

DETAILED DESCRIPTION

Figure 1:
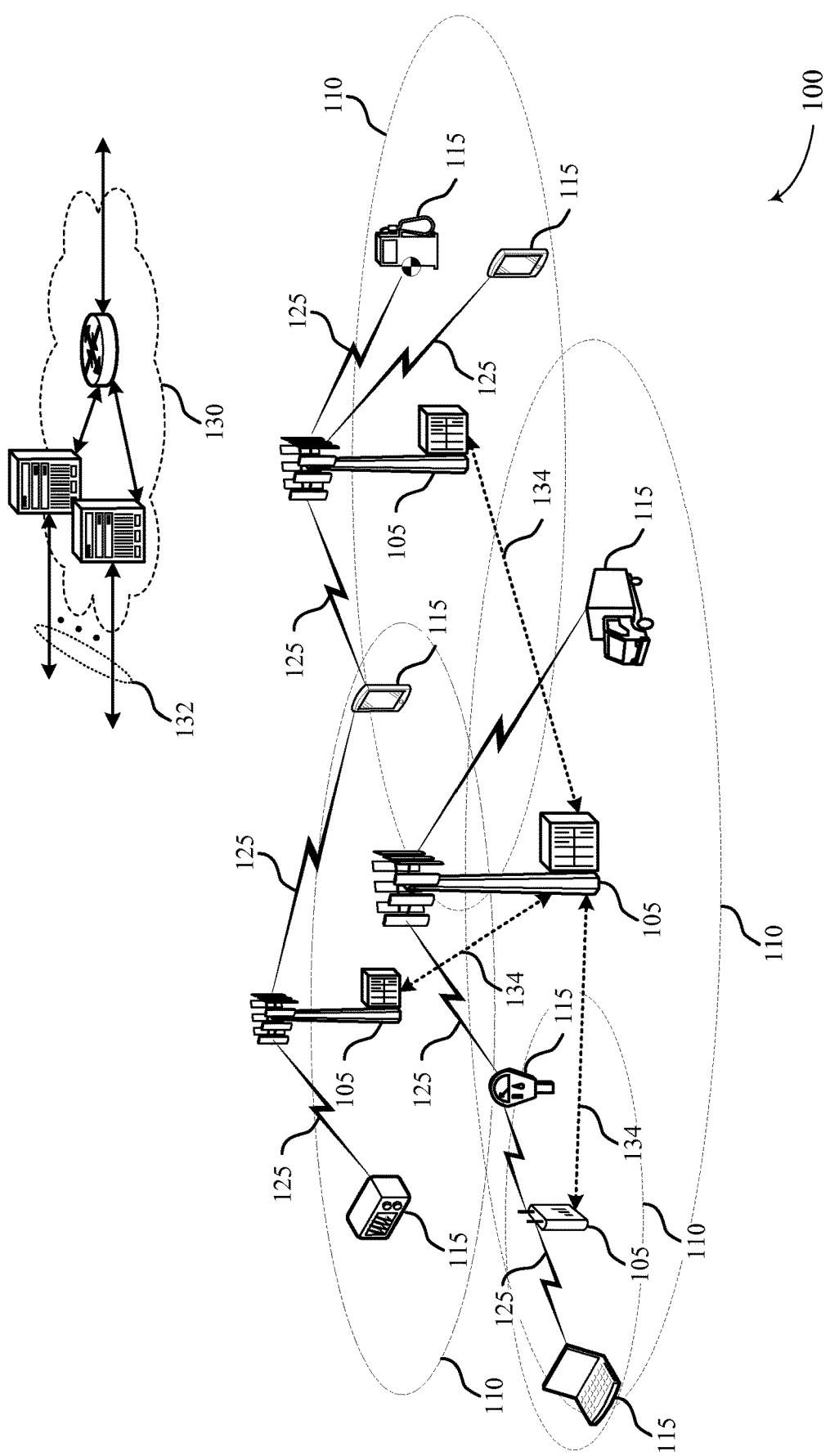
FIG. 1 illustrates an example of a wireless communications system for a cell-specific reference signal (CRS) based control channel element in accordance with various aspects of the present disclosure.

A user equipment (UE) may establish a connection with another wireless node, such as a base station or UE. The connection may include a narrowband control region of a wideband system, and the UE may decode a control channel received in the narrowband control region using demodulation reference signals (DM-RS) or cell-specific reference signals (CRS), or both, as described herein. Some of the example wireless systems described herein provide for automated communication known as Machine-to-Machine (M2M) communication or Machine Type Communication (MTC). M2M or MTC may refer to technologies or devices, such as UEs that communicate without human intervention. In some cases, UEs may operate according to certain constraints (e.g., narrowband operation) even though the UEs may be capable of more complex operation. While some devices, such as MTC devices, may have limited capabilities and may operate accordingly.

By way of example, while some devices (e.g., UEs or MTC devices) may have broadband capacity, other devices may be limited to narrowband communications. This narrowband limitation may, for example, interfere with the ability of a device to receive control channel information using the full bandwidth served by a base station. In some wireless communication systems, such as Long Term Evolution (LTE), an MTC device having limited bandwidth capability (or another device with similar capabilities) may be referred to as a category 0 device.

In some cases, MTC devices may have reduced peak data rates (e.g., a maximum transport block size may be 1000 bits). Additionally, an MTC device may have rank 1 transmission and one antenna for receiving. This may limit an MTC device to half-duplex communication (i.e., the device may not be capable of simultaneously transmitting and receiving). If an MTC device is half-duplex, it may have relaxed switching time (e.g., from transmission (Tx) to reception (Rx) or vice versa). For example, a nominal switching time for a non-MTC device may be 20 μs while a switching time for an MTC device may be 1 ms. MTC enhancements (eMTC) in a wireless system may allow narrowband MTC devices to effectively operate within wider system bandwidth operations (e.g., 1.4/3/5/10/15/20 MHz). For example, an MTC device may support 1.4 MHz bandwidth (i.e., 6 resources blocks). In some instances, coverage enhancements of such MTC devices may be achieved by power boosting of (e.g., of up to 15 dB).

According to the present disclosure, a UE, which may be an MTC device or another UE that supports narrowband operation, may establish a connection with another wireless node using a narrowband control region of a wideband system. The UE may identify a set of resources for a narrowband or MTC physical DL control channel (mPDCCH) within the narrowband control region based on a resource element indexing configuration associated with a cell-specific reference signal (CRS) based demodulation scheme. The UE may then receive the mPDCCH using the identified resources and demodulate the mPDCCH based on the CRS demodulation scheme. In some examples, the resource element indexing configuration may exclude the resource elements used for CRS. In some examples, the resource element indexing configuration may exclude the resource elements used for demodulation reference signals (DM-RS). In some examples, DM-RS resource elements may be indexed separately.

In some cases, a UE or a base station may determine which indexing configuration to use based on coverage and traffic consideration. For example, a UE without coverage enhancement needs may employ an alternative in which only CRS based modulation is used. On the other hand, a UE with coverage enhancement needs may use an alternative in which demodulation is based on both CRS and DM-RS.

The following description provides examples, and is not limiting of the scope, applicability, or examples set forth in the claims. Much of the following discussion describes examples related to MTC devices, but the description is not limited to such devices. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The system 100 includes base stations 105, at least one UE 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies In some examples, the wireless communications system 100 is an LTE/LTE-Advanced (LTE-A) network. In LTE/LTE-A networks, the term evolved node B (eNB) may be generally used to describe the base stations 105, while the term UE may be generally used to describe the UEs 115, which may include MTC devices. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier, or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARM) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

As mentioned above, some types of wireless devices may provide for automated communication. Automated wireless devices may include those implementing Machine-to-Machine (M2M) communication or Machine Type Communication (MTC), which may allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications. In some examples, the UEs 115 are category 0 UEs (e.g., narrowband MTC devices).

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. As discussed below, the communication links 125 may include a narrowband control region. In some examples, a PDCCH (e.g., mPDCCH) may be transmitted on resources of the narrowband control region utilizing a certain resource element indexing configuration. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

A base station 105 may insert periodic pilot symbols such as CRS to improve the efficiency of wireless communication links 125 (e.g., to aid UEs 115 in channel estimation and coherent demodulation). Control channels, such as a PDCCH, may be demodulated based on CRS—e.g., according to a CRS-based demodulation scheme. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 24 resource elements in each resource block based on the number of antenna ports or layers (up to 4) of the receiving UEs 115. In addition to CRS, which may be utilized by all UEs 115 in the coverage area 110 of the base station 105, demodulation reference signal (DM-RS), which may also be referred to as UE-specific reference signals, may be directed toward specific UEs 115 and may be transmitted only on resource blocks assigned to those UEs115. DM-RS may include signals on 24 resource elements in each resource block in which they are transmitted. In some cases, two sets of DM-RS may be transmitted in adjoining resource elements. In some cases, additional reference signals known as channel state information reference signals (CSI-RS) may be included to aid in generating channel state information (CSI). On the uplink, a UE 115 may transmit a combination of periodic sounding reference signal (SRS) and uplink DM-RS for link adaptation and demodulation, respectively.

Wireless communication links 125 may also be established between UEs 115 in a configuration known as device-to-device (D2D) communications. One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105. A device within a D2D implementation may be referred to as a node.

In some embodiments of the system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

LTE systems may utilize orthogonal frequency division multiple access (OFDMA) on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guard band) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8, or 16 sub-bands.

A frame structure may also be used to organize physical resources. Time intervals may be expressed in multiples of a basic time unit (e.g., the sampling period, Ts=1/30,720,000 seconds). Time resources may be organized according to radio frames of length of 10 ms (Tf=307200·Ts), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases, the subframe may be the smallest scheduling unit, also known as a transmission time interval (TTI). In other cases, a TTI may be shorter than a subframe or may be dynamically selected (e.g., in short TTI bursts or in selected component carriers using short TTIs).

A resource element (RE) may consist of one symbol period and one subcarrier (a 15 Khz frequency range). A resource block (RB) may contain 12 consecutive subcarriers in the frequency domain and, for a normal cyclic prefix in each OFDM symbol, 7 consecutive OFDM symbols in the time domain (1 slot), or 84 resource elements. Some REs may include DL reference signals (DL-RS). The DL-RS may include a CRS and a UE-specific RS (UE-RS) or demodulation reference signals (DM-RS). In some cases, reference signals may be transmitted on the resource blocks associated with PDSCH. The number of bits carried by each RE may depend on the modulation scheme (the configuration of symbols that may be selected during each symbol period). Thus, the more resource blocks that a UE receives and the higher the modulation scheme, the higher the data rate may be for the UE.

Data may be divided into logical channels, transport channels, and physical layer channels. Channels may also be classified into Control Channels and Traffic Channels. DL physical channels may include physical broadcast channel (PBCH) for broadcast information, physical control format indicator channel (PCFICH) for control format information, PDCCH for control and scheduling information, physical HARQ indicator channel (PHICH) for HARQ status messages, physical downlink shared channel (PDSCH) for user data and physical multicast channel (PMCH) for multicast data. UL physical channels may include physical random access channel (PRACH) for access messages, physical uplink control channel (PUCCH) for control data, and physical uplink shared channel (PUSCH) for user data.

PDCCH carries downlink control information (DCI) in control channel elements (CCEs), which may consist of nine logically contiguous resource element groups (REGs) located in the first few symbols of a resource block, where each REG contains 4 REs. In other examples, according to the present disclosure, a CCE (e.g., a CCE designed for MTC or narrowband communications) may include 4 non-contiguous REGs that contain 9 or more REs. MTC devices or other UEs 115 may use an evolved physical downlink control channel (ePDCCH) based on DM-RS or MTC PDCCH (mPDCCH) based on CRS, both of which may facilitate coordinated multi-point (CoMP), DL multiple-input-multiple-output (MIMO) enhancements, and inter-cell interference coordination (ICIC) or further enhanced ICIC. For example, instead of spanning the first few symbols in a subframe, like PDCCH, an ePDCCH or mPDCCH may span an entire subframe using selected subcarriers (e.g., it may be frequency-division multiplexed (FDM)). In some cases DM-RS based ePDCCH may be supported and in other cases CRS based PDCCH or mPDCCH may be supported. Thus, the ePDCCH or mPDCCH may be UE-specifically configured (e.g., each UE may be configured to monitor a different set of resources). In some cases, there may be two modes for ePDCCH or mPDCCH operation: localized ePDCCH and distributed ePDCCH. In a localized mode, a single precoder may be applied for each physical resource block (PRB) pair, such as of a control channel. In distributed mode, two or more precoders may be applied to, or may cycle through, the allocated resources within each PRB pair, such as of a control channel.

The DCI included in a PDCCH, ePDCCH, or mPDCCH may include information regarding DL scheduling assignments, UL resource grants, transmission scheme, UL power control, HARQ information, modulation and coding scheme (MCS) and other information. The size and format of the DCI messages can differ depending on the type and amount of information that is carried by the DCI. For example, if spatial multiplexing is supported, the size of the DCI message may be large compared to contiguous frequency allocations. Similarly, for a system that employs MIMO, the DCI may include additional signaling information. DCI size and format may also depend on the amount of information, as well as factors such as bandwidth, the number of antenna ports, and duplexing mode.

PDCCH can carry DCI messages associated with multiple users, and each UE 115 may decode the DCI messages that are intended for it. For example, each UE 115 may be assigned a cell radio network temporary identity (C-RNTI) and cyclic redundancy check (CRC) bits attached to each DCI may be scrambled based on the C-RNTI. To reduce power consumption and overhead at the user equipment, a limited set of CCE locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region may be monitored by all UEs served by a base station 105 and may include information such as paging information, system information, random access procedures, and the like. The UE-specific search space may include user-specific control information. In some cases, CCEs may be indexed, and the common search space may start from CCE 0. The starting index for a UE specific search space may depend on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

According to the present disclosure, a UE 115, such as an MTC device, may establish a connection with another wireless node, such as a base station 105 or another UE. The connection may include a narrowband control region. The UE 115 may identify a set of resources for an mPDCCH within the narrowband control region based on an RE indexing configuration associated with a CRS based demodulation scheme. The UE 115 may then receive the mPDCCH using the identified resources and demodulate the mPDCCH based on the CRS based demodulation scheme. In some examples, the RE indexing configuration may exclude the REs used for CRS. In some examples, the RE indexing configuration may exclude the REs used for DM-RS. In some examples, DM-RS REs may be indexed separately.

Figure 2:
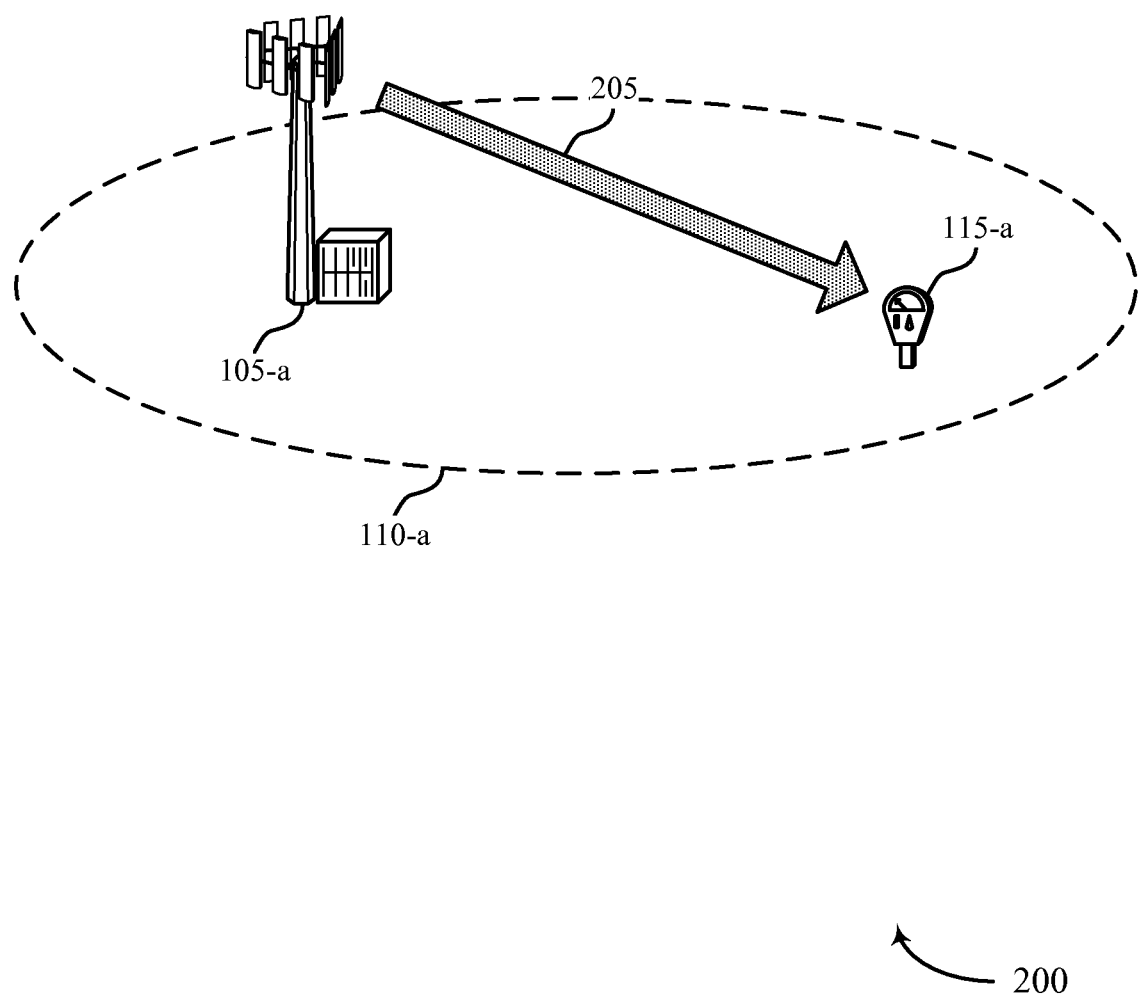
FIG. 2 illustrates an example of a wireless communications system for narrowband control channel decoding in accordance with various aspects of the present disclosure.

FIG. 2 illustrates an example of a wireless communications system 200 for CRS based control channel element in accordance with various aspects of the present disclosure. Wireless communications system 200 may include a UE 115-a, which may be an example of a UE 115 described above with reference to FIG. 1. In some examples, UE 115-a is an MTC device. Wireless communications system 200 may also include a base station 105-a, which may be an example of a base station 105 described above with reference to FIG. 1. Base station 105-a may transmit control information and data to any UE 115 within its coverage area 110-a via downlink 205, as generally described with respect to FIG. 1. For example, downlink 205 may be a narrowband connection that may not utilize the whole range of frequency tones of the cell. For example, the narrowband region may be selected based on the capabilities of the UE 115-a. In some examples of the present disclosure, the actions performed by base station 105-a may be performed by another UE 115 (not shown) according to D2D operations. Base station 105-a may thus be referred to as a node; and other nodes, including certain UEs, of a system may perform the same or similar functions as base station 105-a.

UE 115-a may receive control information via a narrowband control region that may utilize selected frequency tones, and may extend through each symbol period of a subframe. The control information may utilize resources that are identified by an indexing scheme associated with CRS based demodulation. UE 115-a may use the CRS (and, in some cases, DM-RS) transmitted by base station 105-a for coherent demodulation of data conveyed by downlink 205.

Thus, UE 115-a may establish a connection with base station 105-a including downlink 205 and receive data via downlink 205 utilizing a narrowband control region. UE 115-a may identify a set of resources for a PDCCH (e.g., an mPDCCH designed for use by MTC devices) within the narrowband control region based on an RE indexing configuration associated with a CRS based demodulation scheme. UE 115-a may then receive the PDCCH using the identified resources and demodulate the PDCCH based on a CRS. As described below with reference to FIGS. 3A, 3B, and 3C, in some examples the RE indexing configuration may exclude the REs used for CRS. In some examples, the RE indexing configuration may exclude the REs used for DM-RS. In some examples, DM-RS REs may be indexed separately.

Figure 3A:
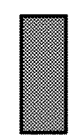
FIG. 3A illustrates an example of an indexing configuration for narrowband control channel decoding in accordance with various aspects of the present disclosure.
Figure 3A:
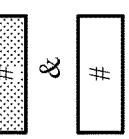

FIG. 3A illustrates an example of an indexing configuration 301 for CRS based control channel element in accordance with various aspects of the present disclosure. Indexing configuration 301 may represent aspects of downlink 205 described above with reference to FIG. 2 Indexing configuration 301 may illustrate a configuration of 14 symbol periods (1 subframe) in the time domain and 12 tones (1 RB) in the frequency domain. Each RE may correspond to the time and frequency resource included in one symbol period on one tone. Indexing configuration 301 may include indexed control region REs 305-a and non-indexed CRS REs 310, whose configuration may be based on the number of antennas and layers used in the communication. In some cases the non-indexed REs may correspond to a maximum CRS configuration (i.e., for a maximum number of antenna ports).

The REs of indexing configuration 301 may be grouped into MTC resource element groups (mREGs) based on the indices. In some case, 9 REs may make up one mREG. A group of 4 mREGs (i.e., 36 REs) may make up an MTC control channel element (mCCE) and one or more mCCEs may contain an mPDCCH (e.g., the number of mCCEs per mPDCCH may depend on an aggregation level parameter of a UE 115).

The REs of indexing configuration 301 may be divided into 16 mREGs, which may be distinguished according to their indices. For example, all of the indexed control region REs 305-a with index 0 may correspond to a single mREG. As shown in indexing configuration 301, the indexing of the REs may be done in a frequency-first-time-second manner. However, in some schemes the indexing may be done in a time-first-frequency-second manner. Irrespective of the indexing manner, the CRS REs 310 may be excluded from the indexing. For example, the indexing of REs may start at the RE for tone 1, symbol period 0, instead of starting at the RE element at tone 0, symbol period 0. The indexing may continue in a sequential manner, progressing through the tones and symbol periods while skipping CRS REs 310. Although the tones of indexing configuration 301 are shown as contiguous, in some examples the tones may not be contiguous.

Thus, mPDCCH may be constructed based on mREGs and mCCEs. For example, a normal CP may result in 144 REs for an mREG: 12 tones×14 symbols−24 CRS=144 REs. In some cases, each PRB pair may include 16 mREGs regardless of subframe type, CP type, PRB pair index, subframe index, etc. For example, there may be 9 REs per mREG for normal CP and there may be 8 REs per mREG for extended CP. Due to the presence of other signals, the number of available REs for mPDCCH may not be fixed and may be different for different mREGs in a PRB pair. For example, some indexed control region REs 305-a may be occupied by other signals. In some cases, a control channel, such as mPDCCH, may include a CCE, such as a mCCE, which may include a set of REGs, such as mREGs. Each REG of the set of REGs may be distributed in time and frequency, such as during subframes within a narrowband control region. In some cases, each REG of the set of REGs excludes resource elements which include DM-RS. In some cases, each REG of the set of REGs excludes resource elements which include a CRS.

mCCEs may be defined by selecting 4 indices (and thus, 4 mREGs). Accordingly, a first group (Group #0) may include mREGs whose REs are indexed with the numbers 0, 4, 8, and 12. A second group (Group #1) may include mREGs whose REs are indexed with the numbers 1, 5, 9, and 13. A third group (Group #2) may include mREGs whose REs are indexed with the numbers 2, 6, 10, and 14. And the fourth group (Group #3) may include mREGs whose REs are indexed with the numbers 3, 7, 11, and 15.

When an mCCE is formed by 4 mREGs, the mCCE may be formed by a single mREG group. However, in some cases mCCE may be formed by 8 mREGs or two mREG groups (e.g., Group #0 and Group #2 or Group #1 and Group #3). In some cases, the location of mREGs in an mREG group may depend on the mode of mPDCCH, and the detailed mapping may depend on the number of PRB pairs configured for mPDCCH. For localized mPDCCH, mREGs of the same group may come from the same PRB pair. Additionally, for localized mPDCCH, each mCCE may be defined within a PRB pair. For distributed mPDCCH, mREGs of the same group may come from different PRB pairs (i.e., each mCCE may be defined across several PRB pairs). For example, an mCCE may consist of mREG 0 from PRB pair 0, mREG 4 of PRB pair 1, mREG 8 of PRB pair 2, and mREG 12 of PRB pair 3. In some examples, the four PRB pairs may be contiguous, while in other examples the four PRB pair may not be contiguous.

The number of available REs per mCCE for mPDCCH may not be fixed and may be different for different mCCEs. However, mREG grouping-based mCCE definition may help equalize the number of available REs per mCCE (e.g., 2 CRS ports, normal CP, normal subframes).

In some cases, each UE may be configured with up to K=2 mPDCCH resource sets. Each resource set may be separately configured with M=2, 4, or 6 PRB pairs. Additionally, each resource set may be configured with either localized or distributed mode. Regarding the search space for localized mPDCCH, the candidates may be spaced in as many different PRB pairs as possible in order to exploit sub-band scheduling for mPDCCH. The search space for distributed mPDCCH may be similar to PDCCH described above with reference to FIG. 1. In some cases, the REs occupied by other signals known to the UE may be rate-matched around by mPDCCH (e.g., legacy control region, CRS, UE-specifically configured channel state information reference signals (CSI-RS), etc.).

Figure 3B:
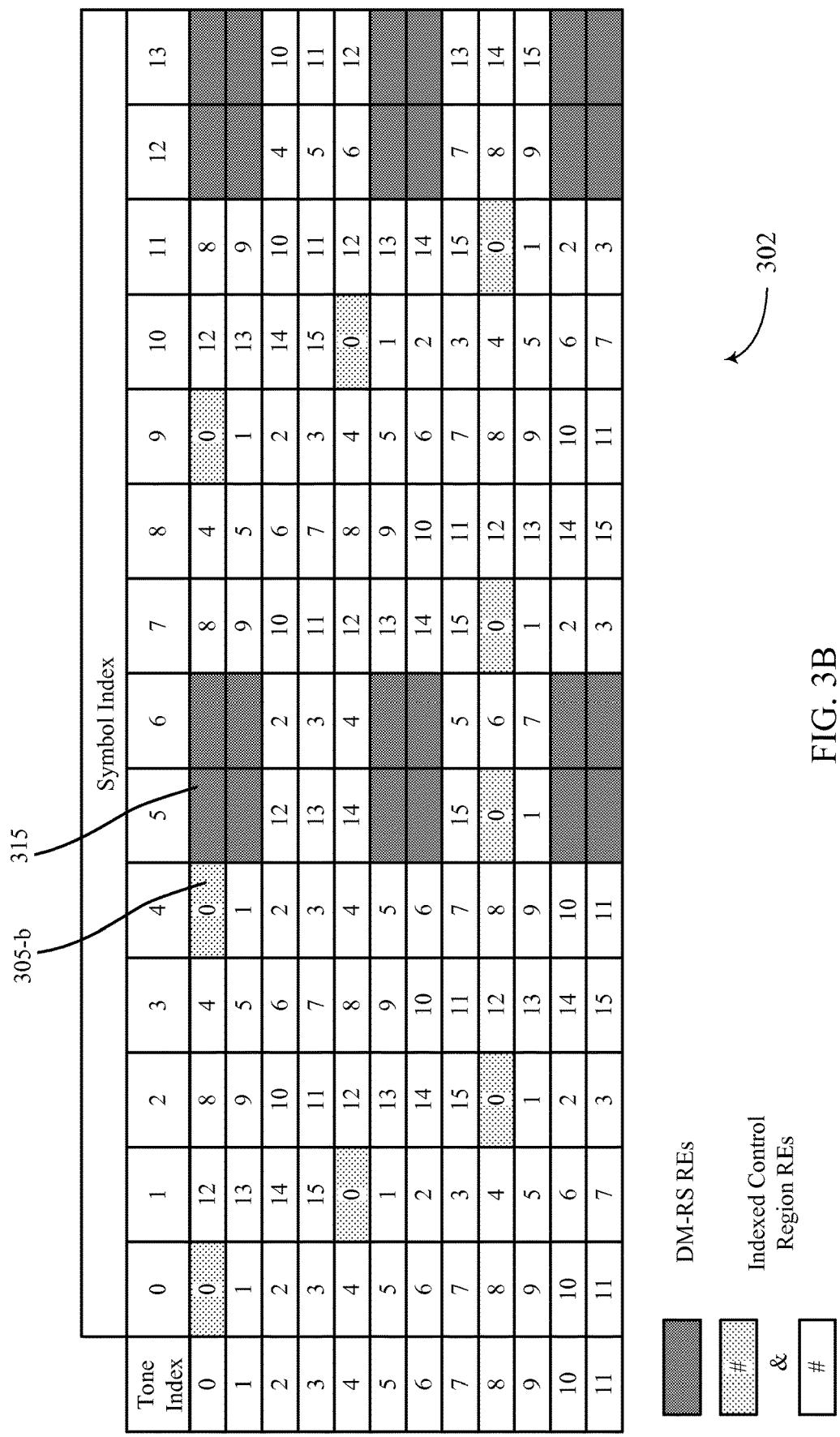
FIG. 3B illustrates an example of an indexing configuration for narrowband control channel decoding in accordance with various aspects of the present disclosure.

FIG. 3B illustrates an example of an indexing configuration 302 for narrowband control channel decoding in accordance with various aspects of the present disclosure. Indexing configuration 302 may represent aspects of downlink 205 described above with reference to FIG. 2 Indexing configuration 302 may illustrate a configuration of 14 symbol periods (1 subframe) in the time domain the and 12 tones (1 RB) in the frequency domain. Each RE may correspond to the time and frequency resource included in one symbol period on one tone. Indexing configuration 302 may include indexed control region REs 305-b and non-indexed DM-RS REs 315. In some cases, the number of DM-RS REs 315 may be based on the cyclic prefix (CP). For example, an mREG may include 24 DM-RS REs for a normal CP and may include 16 DM-RS for extended CP. Indexing configuration 302 may include aspects of indexing configuration 301 described with reference to FIG. 3A.

The REs of indexing configuration 302 may be indexed according to a frequency-first-time-second manner, and may exclude DM-RS REs 315. For example, the REs may be indexed in a progressive manner until a DM-RS RE 315 is encountered. When a DM-RS RE 315 is encountered, the DM-RS RE 315 may not be indexed. The indexing of the REs may resume when a non-DM-RS RE is encountered. In some examples, a UE 115 may use the DM-RS REs 315 in combination with CRS to determine channel and interference estimation. As described above with reference to FIG. 3A, the REs of indexing configuration 302 may be grouped into mREGs based on the indices. Thus, 9 REs may make up one mREG. A group of 4 mREGs (i.e., 36 REs) may make up an mCCE and one or more mCCEs may contain an mPDCCH.

UEs 115 may combine CRS and DM-RS REs for channel/interference estimation. Such a scheme may be used for CRS and DM-RS base mPDCCH decoding. Additionally, such a scheme may promote interference cancellation from ePDCCH or mPDCCH transmissions, thus possibly increasing its compatibility with ePDCCH (which may be based on a configuration similar to indexing configuration 302).

Figure 3C:
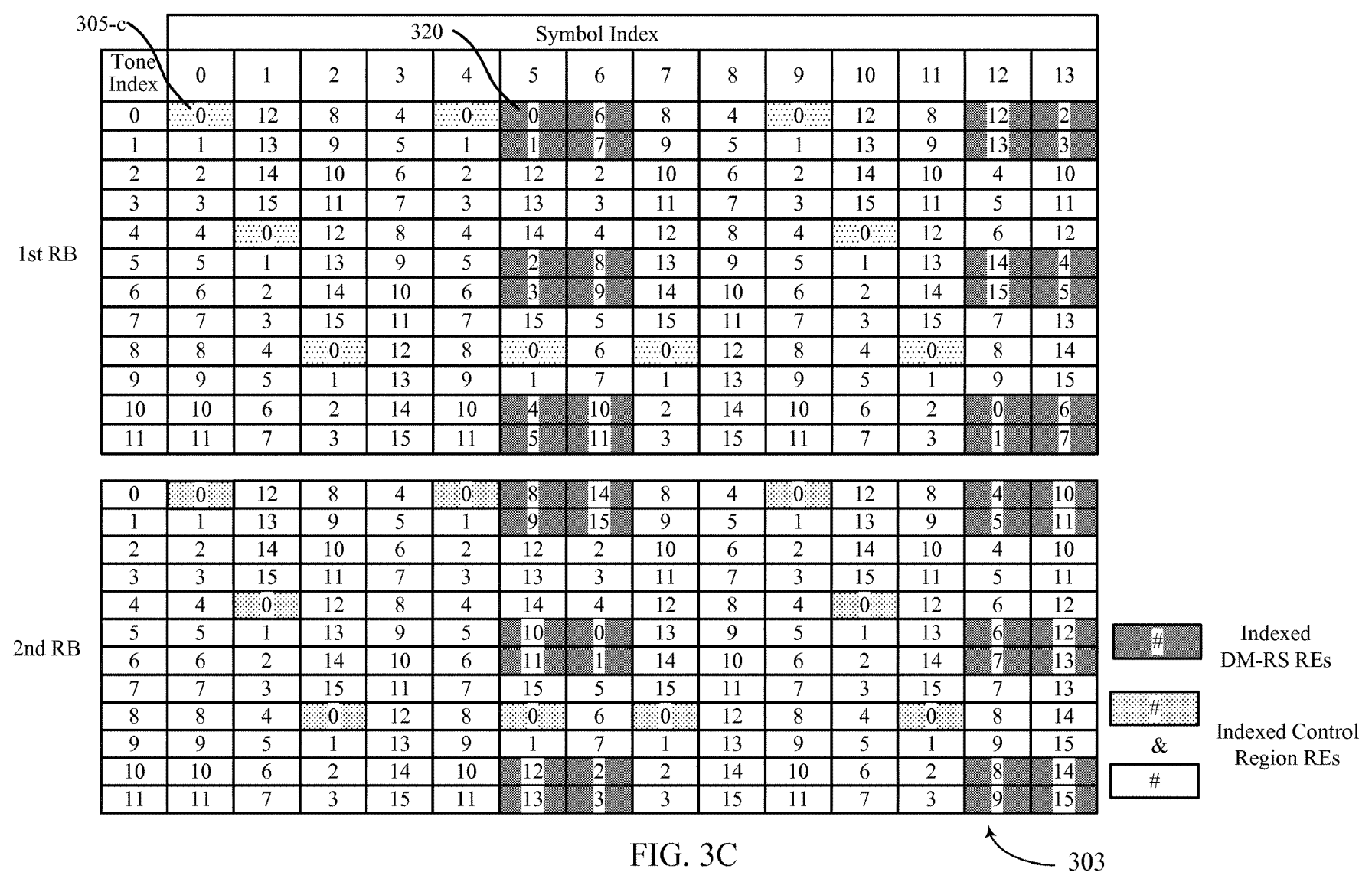

FIG. 3C illustrates an example of an indexing configuration 303 for narrowband control channel decoding in accordance with various aspects of the present disclosure. Indexing configuration 302 may represent aspects of downlink 205 described above with reference to FIG. 2 Indexing configuration 303 may illustrate a configuration of 14 symbol periods (1 subframe) in the time domain the and 12 tones (1 RB) in the frequency domain. Each RE may correspond to the time and frequency resource included in one symbol period on one tone. Indexing configuration 303 may include indexed control region REs 305-c and indexed DM-RS REs 320. In some cases, the number of DM-RS REs 315 may be based on the cyclic prefix (CP). For example, an mREG may include 24 DM-RS REs for a normal CP and may include 16 DM-RS for extended CP. Indexing configuration 303 may include aspects of indexing configuration 301 and 302 described with reference to FIGS. 3A and 3B.

According to indexing configuration 303, all REs of a control region may be indexed (i.e., both control region REs 305-c and DM-RS REs 320). Although shown indexed in a frequency-first-time-second manner, in some cases the REs of resource block pair may be indexed in a time-firstfrequency-second manner. Regardless of the manner of indexing, the indexed control region REs 305-*c* may be indexed separately from the DM-RS REs 20. For example, the indexing of first resource block may progress in a sequential manner, skipping over DM-RS REs 320. Accordingly, the DM-RS REs 320 of first resource block may be indexed in a similar sequential manner, skipping over the control region REs 305-*c*. The indexing for DM-RS REs 320 may continue in the second resource block. Although shown in regards to resource blocks which carry DM-RS, the indexing configuration 303 may be used to index resource blocks which carry other reference signals (e.g., CRS). As described above with reference to FIG. 3A, the REs of indexing configuration 303 may be grouped into mREGs based on the indices. Thus, 9 REs may make up one mREG. A group of 4 mREGs (i.e., 36 REs) may make up an mCCE and one or more mCCEs may contain an mPDCCH.

In some cases, the starting index for different RBs may be different, which may result in a more uniform mREG size. For example, the first RB may start from mREG 0 while a second RB may start from mREG 8. Alternatively, if an mCCE follows the same grouping concept (e.g., an mCCE has mREGs 0/4/8/12) the starting index for the first RB may be the same as the starting index for the second RB. In such examples, each mREG may have an average of 10.5 REs. In some cases, the mREG definition may exclude both DM-RS and CRS REs. Or, in some examples, the actual CRS ports may be excluded from the mREG definition.

Figure 4:
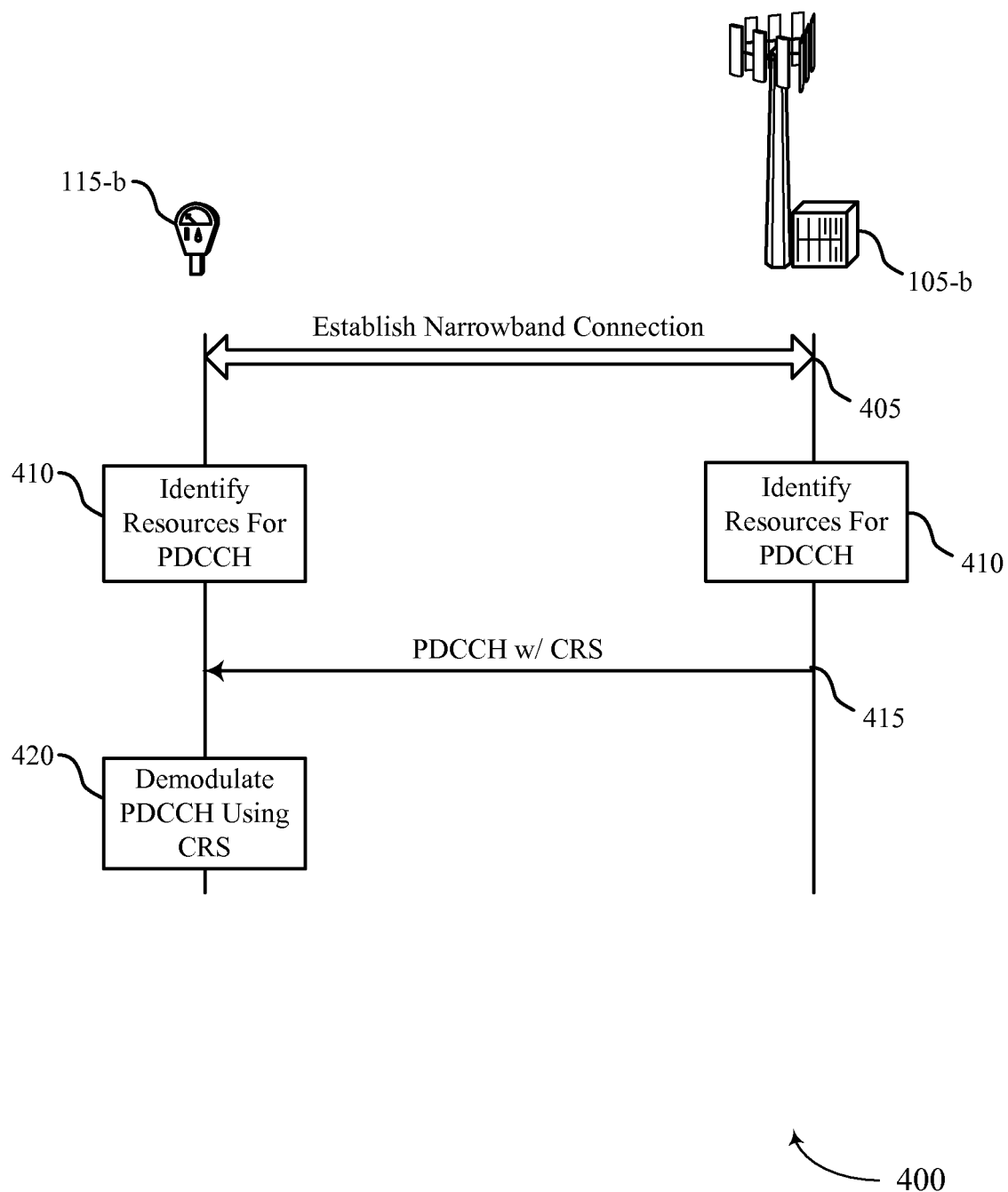
FIG. 4 illustrates an example of a process flow for narrowband control channel decoding accordance with various aspects of the present disclosure.

FIG. 4 illustrates an example of a process flow 400 for narrowband control channel decoding in accordance with various aspects of the present disclosure. Process flow 400 may include a UE 115-*b*, which may be an example of a UE 115 described above with reference to FIGS. 1-2 (e.g., an MTC device). Process flow 400 may also include a base station 105-*b*, which may be an example of a base station 105 described above with reference to FIGS. 1-2. In some examples of the present disclosure, the actions performed by base station 105-*b* may be performed by another UE 115 (not shown) according to D2D operations.

At message 405, UE 115-*b* and base station 105-*b* may establish a connection based on a narrowband control region. In some cases, the narrowband control region may not include all the frequency tones supported by base station 105-*b*.

At block 410, UE 115-*b* and base station 105-*b* may identify a set of resources in the narrowband control region based at least in part on an RE indexing configuration associated with a CRS based demodulation scheme. In some examples the RE indexing configuration excludes a set of REs associated with a CRS configuration as described above with reference to FIG. 3A (e.g., based on a CRS configuration that includes a maximum number of CRS ports). In some examples, the RE indexing configuration excludes a set of REs associated with a DM-RS configuration as described above with reference to FIG. 3B. In some examples, the RE indexing configuration includes a set of separately indexed REs associated with a DM-RS configuration as described above with reference to FIG. 3C. In some cases, resources of the narrowband region which include a control region, such as for broadband communication from the control channel, may be excluded. Base station 105-*b* may, for instance, transmit (and UE 115-*b* may receive) a message indicating a size, or resources, of a broadband control region to be excluded from the set of resources. Similarly, base station 105-*b* may transmit (and UE 115-*b* may receive) a message indicating the resources of the narrowband region which include the control region for broadband communications. The UE 115-*b*, or another base station 105, may determine the resources of the narrowband region which includes the control region for the broadband communications based at least in part on the message.

At message 415, base station 105-*b* may transmit (and UE 115-*b* may receive) a PDCCH (e.g., an mPDCCH) based on the set of resources. The transmission may also include CRS for demodulation and, in some cases, DM-RS.

At message 415, UE 115-*b* may demodulate the PDCCH based on a CRS (e.g., using CRS transmitted by base station 105-*b*). In some examples, the demodulation of the PDCCH is also based on a DM-RS. UE 115-*b* may identify a number of subframes during which to monitor a DM-RS for decoding the PDCCH. In some cases, the PDCCH may include a narrowband region within a wideband system. In some cases, the number of subframes may have the same precoding for the DM-RS. UE 115-*b* may decode the PDCCH based at least in part on the DM-RS. In some cases, UE 115-*b* may map a set of modulation symbols to the set of resources. In some cases, UE 115-*b* may identify two or more RBs that have the same precoding, such as RBs with the same precoding within the narrowband region. The RBs which have the same precoding may be a part of the PDCCH.

In some examples, (not shown) base station 105-*b* may transmit (and UE 115-*b* may receive) a second PDCCH, in a manner similar to message 415, using a same precoding as the PDCCH according to a bundling configuration or using a different precoding from the PDCCH according to a predetermined precoding pattern. In some examples, the PDCCH and the second PDCCH include the same content and may be transmitted in a different frequency resource or a different time resource. In some cases, UE 115-*b* may identify two or more RBs that have the same precoding, such as RBs with the same precoding within the narrowband region. The RBs which have the same precoding may be a part of the second PDCCH.

Additionally, bundling of mPDCCH may be supported, which may improve mPDCCH decoding performance. In such instances, the same precoding may be assumed over multiple RBs and/or multiple subframes. When TTI bundling is used (i.e., when mPDCCH is transmitted over multiple frames), time-domain precoding may be helpful. In an alternative example, different precoding may be assumed, but the precoding may be predetermined or known at the UE (e.g., some precoding cycling in different RBs and/or subframes). In the case an MTC device only supports 6-RB operation, a larger fast Fourier transform (FFT) size (e.g., 8-RB) may be used to improve bandwidth edge performance.

In some cases, include those in which mPDCCH rate matching is used, a UE may assume that the legacy control region is not used for mPDCCH. Additionally, the legacy control region may be assumed to be the maximum possible size. Accordingly, if the system bandwidth is 10 RBs or less, 4 control symbols may be assumed for the legacy control region. Otherwise, 3 control symbols may be assumed for the legacy control size. Alternatively, instead of assuming the maximum possible legacy control region, the size of the legacy control region may be indicated to the UE. In such instances, the indicated control region size may include zero-size (i.e., no legacy control region) so that other carrier types (e.g., an LTE-U carrier, which may not have a legacy control region) or operations may be covered.

Figure 5:
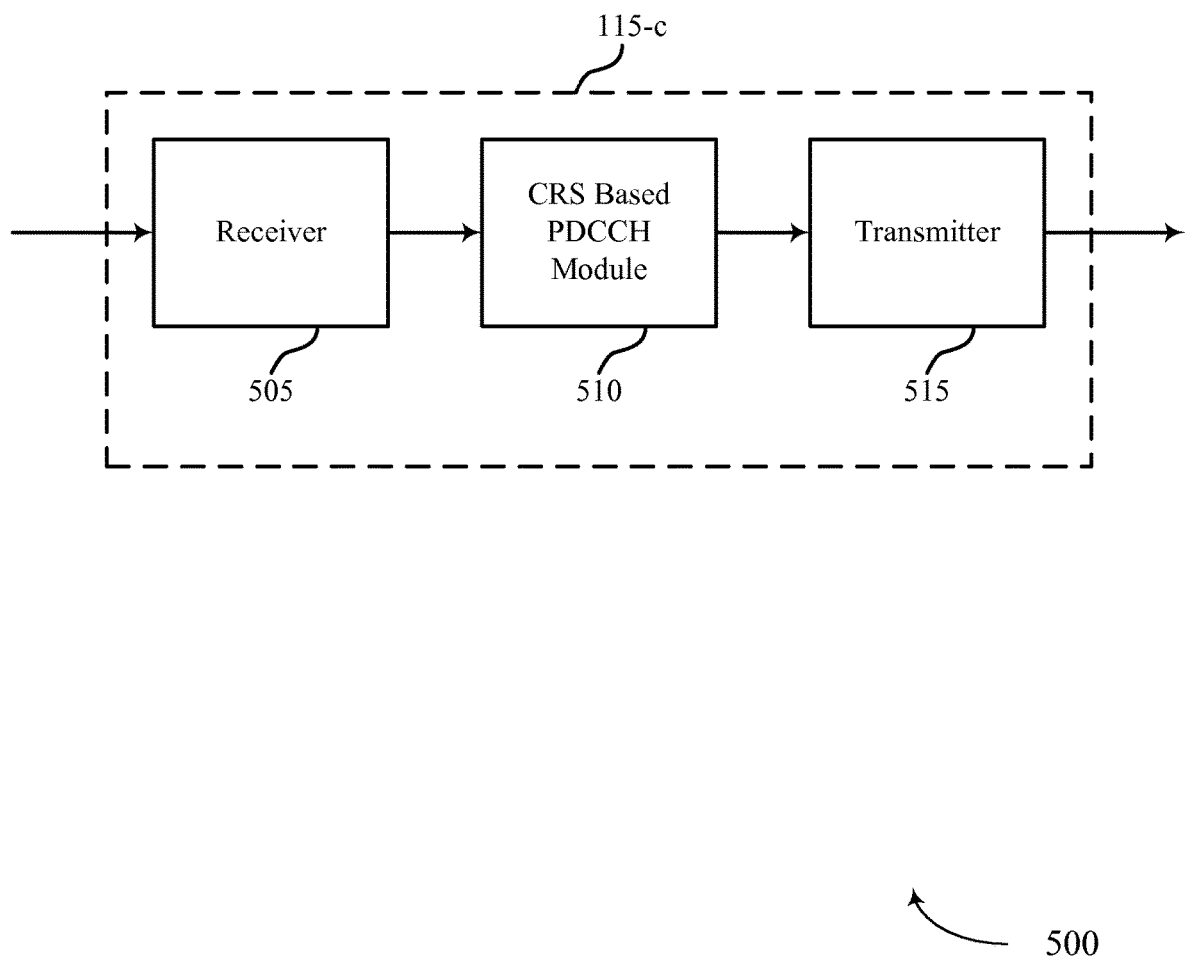
FIG. 5 shows a block diagram of a user equipment (UE) configured for narrowband control channel decoding in accordance with various aspects of the present disclosure.

FIG. 5 shows a block diagram 500 of a UE 115-*c* configured for narrowband control channel decoding in accordance with various aspects of the present disclosure.

UE 115-c may be an example of aspects of a UE 115 described with reference to FIGS. 1-4. UE 115-c may include a receiver 505, a CRS based PDCCH module 510, or a transmitter 515. UE 115-c may also include a processor. Each of these components may be in communication with one another.

The receiver 505 may receive information such as packets, user data, or control information associated with various information channels (e.g., control channels, data channels, and information related to a CRS based control channel element, etc.). Information may be passed on to the CRS based PDCCH module 510, and to other components of UE 115-c. The receiver 505 may receive a PDCCH based on a set of resources. In some examples, the receiver 505 may receive a message indicating a size of the broadband control region to be excluded from the set of resources. The receiver 505 may also receive a second PDCCH using a same precoding as the PDCCH according to a bundling configuration. In some examples, the receiver 505 may receive a second PDCCH using a different precoding from the PDCCH according to a predetermined precoding pattern. Additionally or alternatively, the PDCCH and the second PDCCH may include the same content and may be transmitted in a different frequency resource or a different time resource. In some cases, the receiver 505 may receive a message indicating the resources of the narrowband region which include the control region for broadband communications.

The CRS based PDCCH module 510 may establish a connection with a node (such as a UE 115 or base station 105), where the connection may include a narrowband control region, and the CRS based PDCCH module 510 may identify a set of resources in the narrowband control region based on a resource element indexing configuration associated with a CRS based demodulation scheme. The CRS based PDCCH module 510 may also receive a PDCCH based on the set of resources, and it may demodulate the PDCCH based at least in part on a CRS. In some cases, the CRS based PDCCH module 510 may identify a plurality of subframes during which to monitor a DM-RS for decoding a control channel associated with a node. The control channel may include a narrowband region and may be within a wideband system. In some cases, the plurality of subframes may have a same precoding for the DM-RS. The CRS based PDCCH module 510 may further decode the control channel based at least in part on the DM-RS.

The transmitter 515 may transmit signals received from other components of UE 115-c. In some embodiments, the transmitter 515 may be collocated with the receiver 505 in a transceiver module. The transmitter 515 may include a single antenna, or it may include a plurality of antennas.

Figure 6:
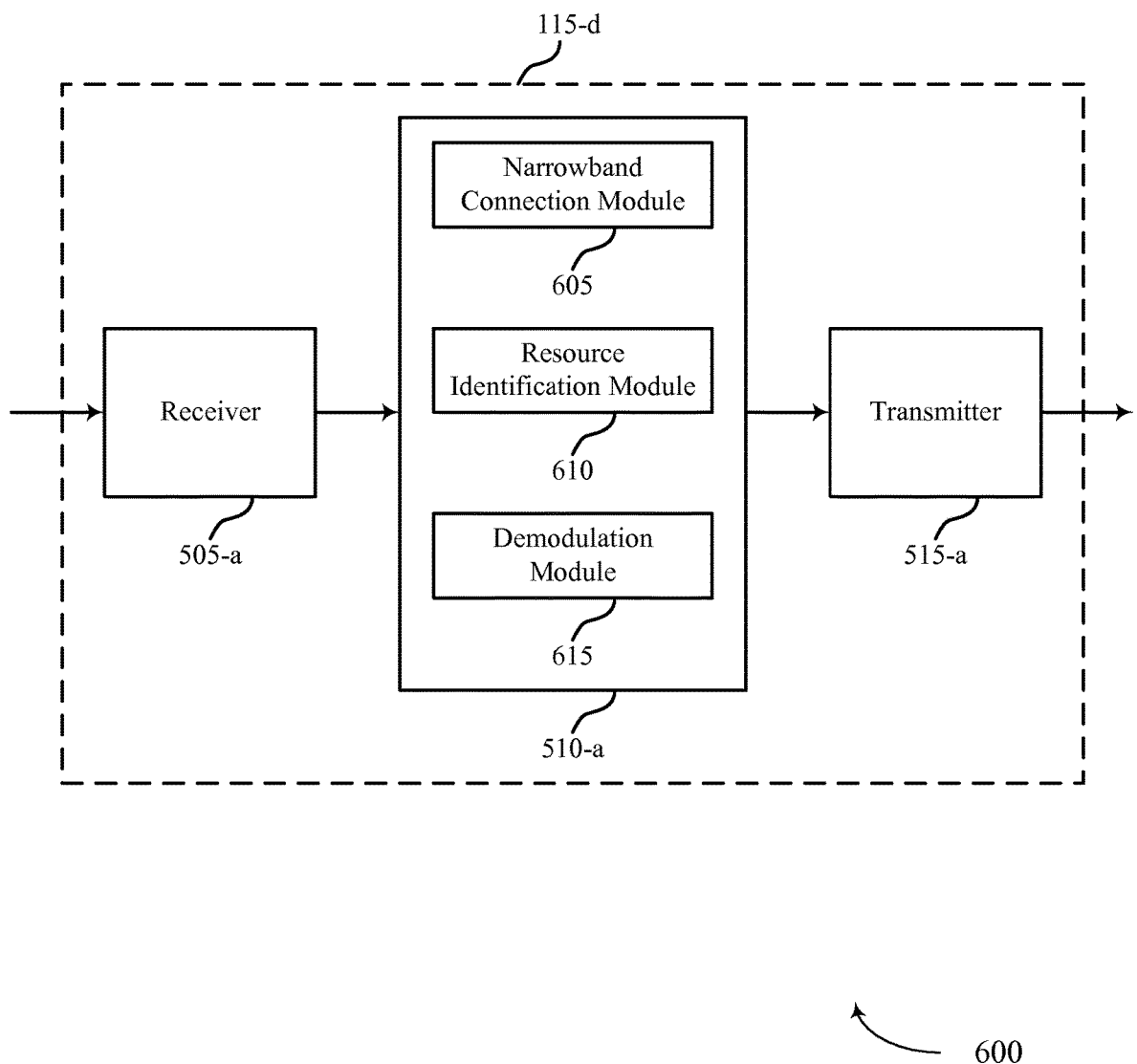
FIG. 6 shows a block diagram of a UE configured for narrowband control channel decoding in accordance with various aspects of the present disclosure.

FIG. 6 shows a block diagram 600 of a UE 115-d for narrowband control channel decoding in accordance with various aspects of the present disclosure. UE 115-d may be an example of aspects of a UE 115 described with reference to FIGS. 1-5. UE 115-d may include a receiver 505-a, a CRS based PDCCH module 510-a, or a transmitter 515-a. UE 115-d may also include a processor. Each of these components may be in communication with one another. The CRS based PDCCH module 510-a may also include a narrowband connection module 605, a resource identification module 610, and a demodulation module 615.

The receiver 505-a may receive information which may be passed on to CRS based PDCCH module 510-a, and to other components of UE 115-d. The CRS based PDCCH module 510-a may perform the operations described above with reference to FIG. 5. The transmitter 515-a may transmit signals received from other components of UE 115-d.

The narrowband connection module 605 may establish a connection with a node (such as a UE 115 or base station 105), where the connection may include a narrowband control region as described above with reference to FIGS. 2-4. In some cases, the narrowband connection module 605 may exclude resources of the narrowband region which include a control region for broadband communications from the control channel.

The resource identification module 610 may identify a set of resources in the narrowband control region based at least in part on a resource element indexing configuration associated with a CRS based demodulation scheme as described above with reference to FIGS. 2-4. In some examples, the resource element indexing configuration excludes a set of resource elements associated with a CRS configuration. In some examples, the resource element indexing configuration excludes a set of resource elements associated with a DM-RS configuration. In some examples, the resource element indexing configuration includes a set of separately indexed resource elements associated with a DM-RS configuration. The CRS demodulation scheme may, for instance, be based on a CRS configuration that includes a maximum number of CRS ports. In some cases, the resource identification module 610 identifies a plurality of subframes during which to monitor a DM-RS for decoding a control channel associated with a node. The control channel may include a narrowband region of a wideband system and the plurality of subframes may have a same precoding for the DM-RS. The resource identification module 610 may identify two or more RBs that have the same precoding within the narrowband region. In some cases, the resource identification module 610 may determine the resources of the narrowband region which include the control region for the broadband communications based at least in part on a message. In some cases, the resource identification module 610 may exclude resources of the narrowband region which include a control region for broadband communications from the control channel.

The demodulation module 615 may demodulate the PDCCH based on a CRS as described above with reference to FIGS. 2-4. In some cases, the demodulation may also be based on a DM-RS. The demodulation module 615 may decode the control channel based at least in part on the DM-RS.

Figure 7:
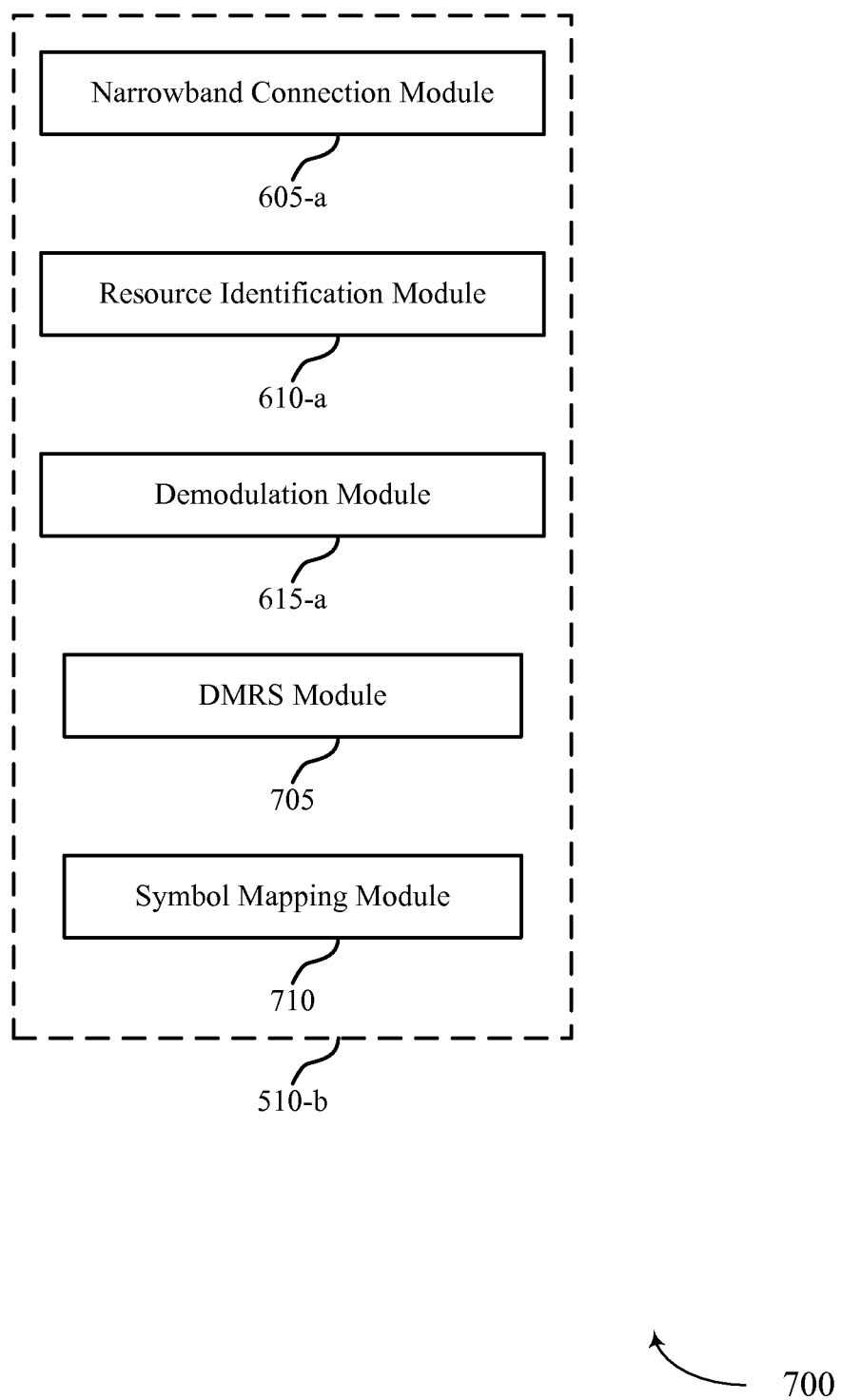
FIG. 7 shows a block diagram of a CRS based physical downlink control channel (PDCCH) module configured in accordance with various aspects of the present disclosure.

FIG. 7 shows a block diagram 700 of a CRS based PDCCH module 510-b for narrowband control channel decoding in accordance with various aspects of the present disclosure. The CRS based PDCCH module 510-b may be an example of aspects of a CRS based PDCCH module 510 described with reference to FIG. 5 or 6. The CRS based PDCCH module 510-b may include a narrowband connection module 605-a, a resource identification module 610-a, and a demodulation module 615-a. Each of these modules may perform the functions described above with reference to FIG. 6. The CRS based PDCCH module 510-b may also include a DM-RS module 705, and a symbol mapping module 710.

The DM-RS module 705 may be configured such that the demodulation of the PDCCH may be based on a DM-RS as described above with reference to FIGS. 2-4. In some cases the DM-RS module 705 may decode the control channel based at least in part on the DM-RS.

The symbol mapping module 710 may map a set of modulation symbols to the set of resources, where the mapping excludes a broadband control region from the set as described above with reference to FIGS. 2-4.

The components of UE 115-*c*, UE 115-*d*, or CRS based PDCCH module 510-*b* may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 8:
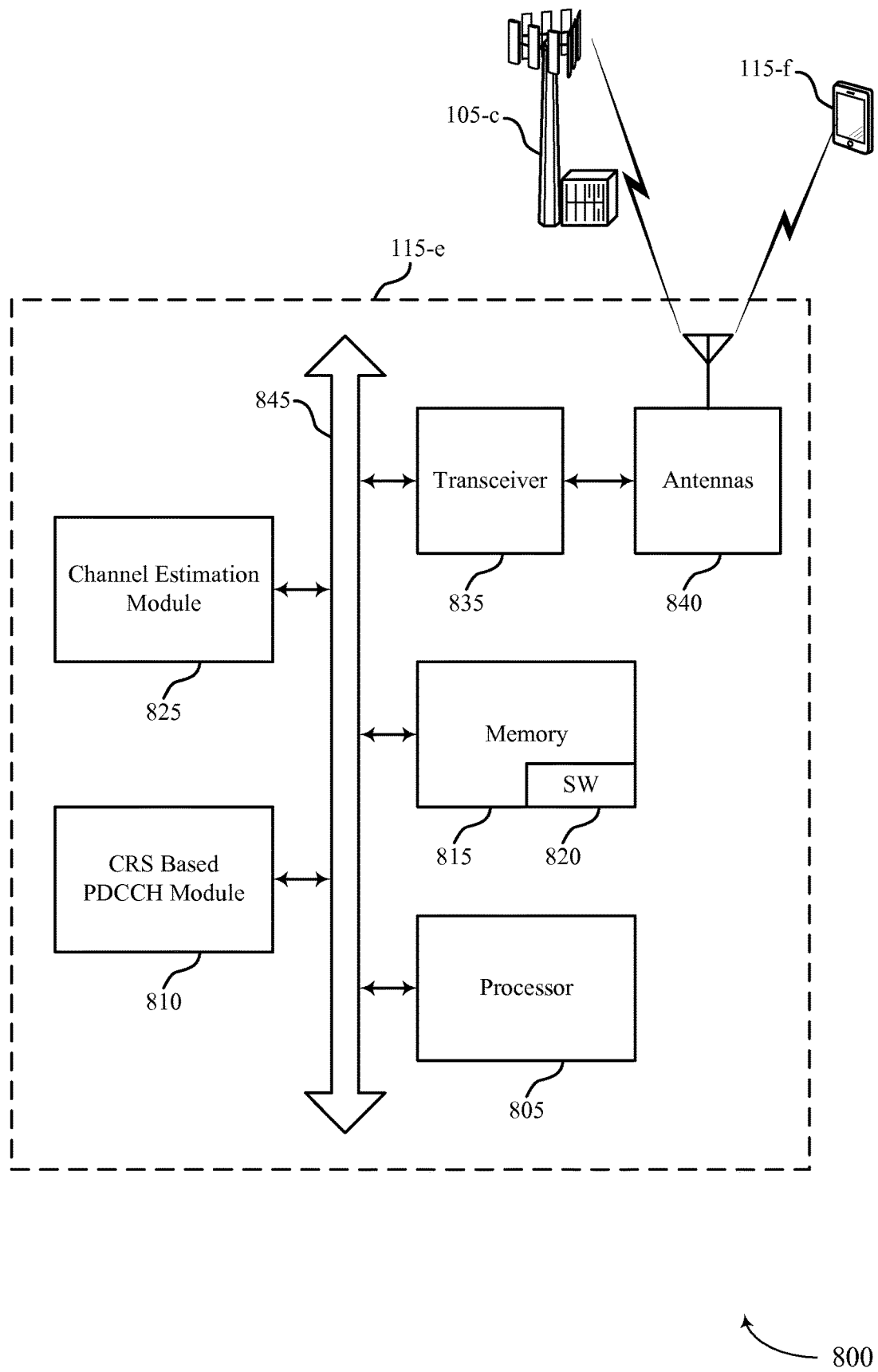
FIG. 8 illustrates a block diagram of a system including a UE configured for narrowband control channel decoding in accordance with various aspects of the present disclosure.

FIG. 8 shows a diagram of a system 800 including a UE 115 configured for narrowband control channel decoding in accordance with various aspects of the present disclosure. System 800 may include UE 115-*e*, which may be an example of a UE 115 described above with reference to FIGS. 1-7. UE 115-*e* may include a CRS based PDCCH module 810, which may be an example of a CRS based PDCCH module 510 described with reference to FIGS. 5-7. UE 115-*e* may also include a channel estimation module 825. UE 115-*e* may also include components for bi-directional voice and data communications including components for transmitting communications and components for receiving communications. For example, UE 115-*e* may communicate bi-directionally with UE 115-*f* or base station 105-*c*.

UE 115-*e* may also include a processor module 805, and memory 815 (including software (SW) 820), a transceiver module 835, and one or more antenna(s) 840, each of which may communicate, directly or indirectly, with one another (e.g., via buses 845). The transceiver module 835 may communicate bi-directionally, via the antenna(s) 840 or wired or wireless links, with one or more networks, as described above. For example, the transceiver module 835 may communicate bi-directionally with a base station 105 or another UE 115. The transceiver module 835 may include a modem to modulate the packets and provide the modulated packets to the antenna(s) 840 for transmission, and to demodulate packets received from the antenna(s) 840. While UE 115-*e* may include a single antenna 840, UE 115-*e* may also have multiple antennas 840 capable of concurrently transmitting or receiving multiple wireless transmissions.

The channel estimation module 825 may estimate channel conditions and generate channel state information (CSI) reports based on the channel estimates. In some examples, CRS may be used for channel estimation. A wireless communications link may then be updated based on the CSI.

The memory 815 may include random access memory (RAM) and read only memory (ROM). The memory 815 may store computer-readable, computer-executable software/firmware code 820 including instructions that, when executed, cause the processor module 805 to perform various functions described herein (e.g., narrowband control channel decoding, etc.). Alternatively, the software/firmware code 820 may not be directly executable by the processor module 805 but cause a computer (e.g., when compiled and executed) to perform functions described herein. The processor module 805 may include an intelligent hardware device, (e.g., a central processing unit (CPU), a microcontroller, an ASIC, etc.)

Figure 9:
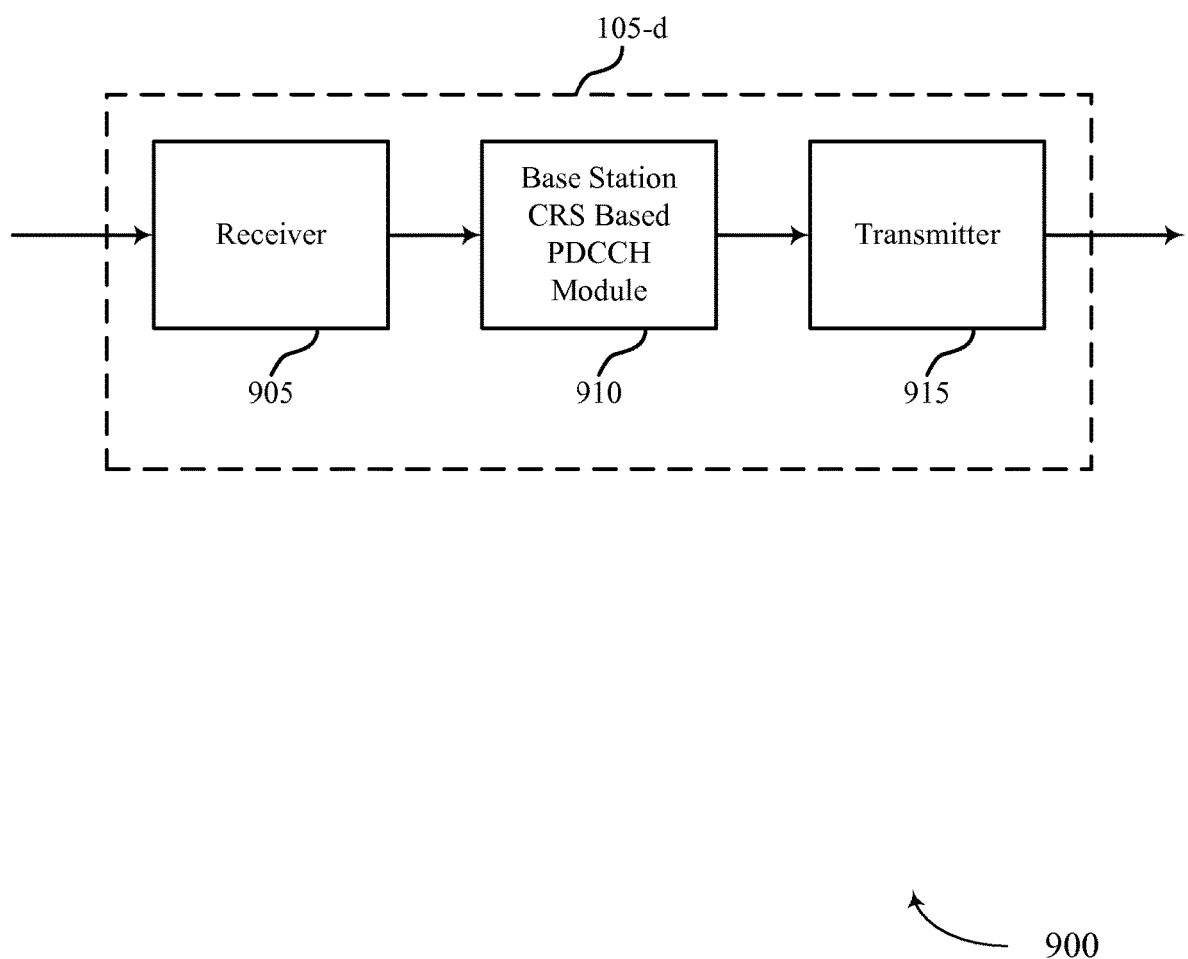
FIG. 9 shows a block diagram of a base station configured for narrowband control channel decoding in accordance with various aspects of the present disclosure.

FIG. 9 shows a block diagram 900 of a base station 105-*d* configured for narrowband control channel decoding in accordance with various aspects of the present disclosure. Base station 105-*d* may be an example of aspects of a base station 105 or a UE 115 described with reference to FIGS. 1-8. Base station 105-*d* may include a receiver 905, a base station CRS based PDCCH module 910, or a transmitter 915. Base station 105-*d* may also include a processor. Each of these components may be in communication with one another. In some examples of the present disclosure, the structure of base station 105-*d* may be found in a UE 115 by operating according to D2D operations.

The receiver 905 may receive information such as packets, user data, or control information associated with various information channels (e.g., control channels, data channels, and information related to a CRS based control channel element, etc.). Information may be passed on to the base station CRS based PDCCH module 910, and to other components of base station 105-*d*.

The base station CRS based PDCCH module 910 may establish a connection with a UE 115, where the connection may include a narrowband control region, identify a set of resources for the UE 115 in the narrowband control region based at least in part on a resource element indexing configuration associated with a CRS based demodulation scheme, transmit a PDCCH to the UE 115 using the set of resources, and transmit a CRS in a same resource block as the set of resources.

The transmitter 915 may transmit signals received from other components of base station 105-*d*. In some embodiments, the transmitter 915 may be collocated with the receiver 905 in a transceiver module. The transmitter 915 may include a single antenna, or it may include a plurality of antennas. In some examples, the transmitter 515 may transmit a message indicating a size of the broadband control region to be excluded. In some examples, the transmitter 515 may transmit a second PDCCH using a same precoding as the PDCCH according to PDCCH bundling configuration. In some examples, the transmitter 515 may transmit a second PDCCH using a different precoding from the PDCCH according to a predetermined precoding pattern. The PDCCH and the second PDCCH may include the same content and may be transmitted in a different frequency resource or a different time resource.

Figure 10:
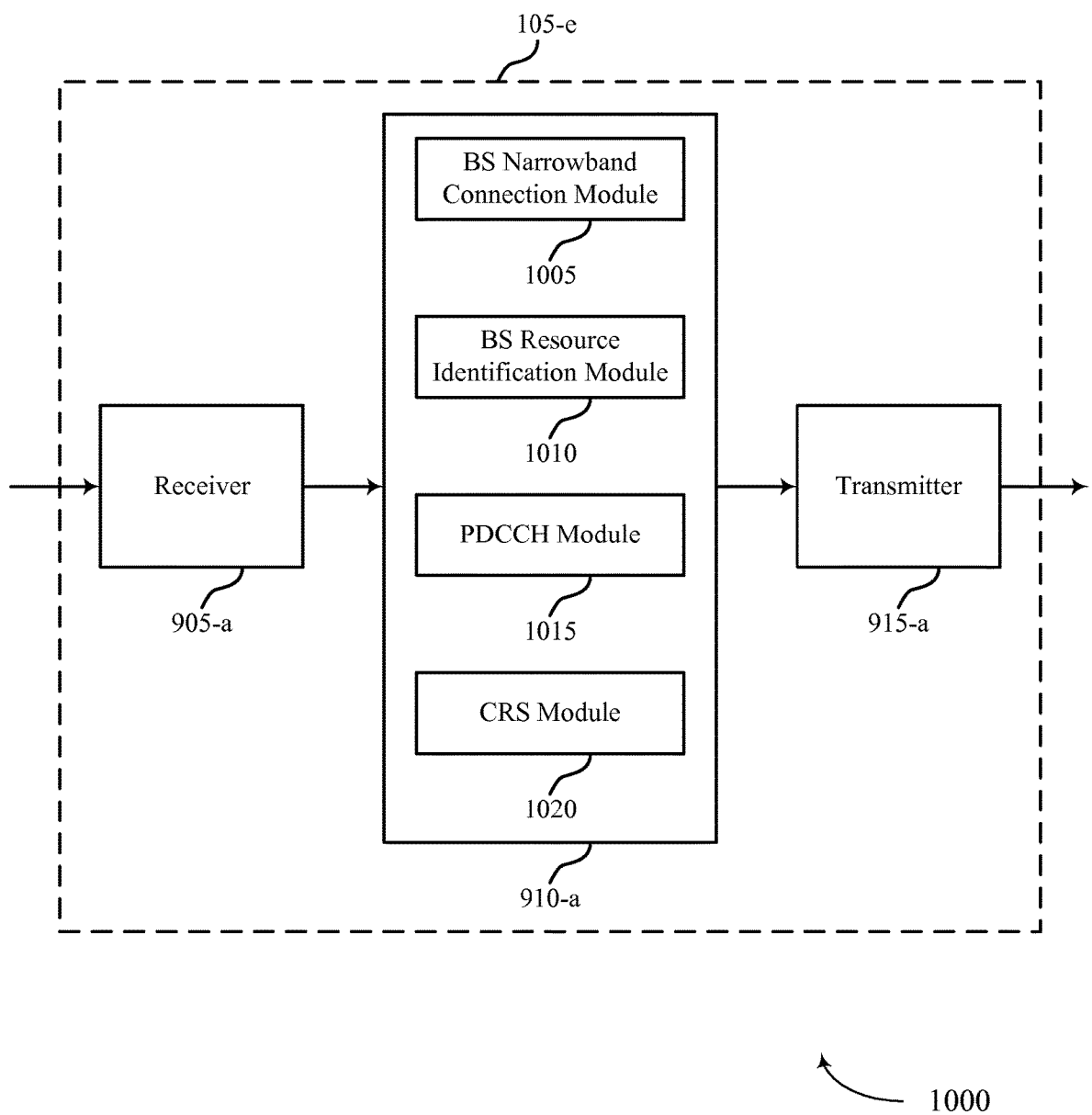
FIG. 10 shows a block diagram of a base station CRS based PDCCH module configured in accordance with various aspects of the present disclosure.

FIG. 10 shows a block diagram 1000 of a base station 105-*e* for narrowband control channel decoding in accordance with various aspects of the present disclosure. Base station 105-*e* may be an example of aspects of a base station 105 described with reference to FIGS. 1-9. Base station 105-*e* may include a receiver 905-*a*, a base station CRS based PDCCH module 910-*a*, or a transmitter 915-*a*. Base station 105-*e* may also include a processor. Each of these components may be in communication with one another. The base station CRS based PDCCH module 910-*a* may also include a BS narrowband connection module 1005, a BS resource identification module 1010, a PDCCH module 1015, and a CRS module 1020. In some examples of the present disclosure, the structure of base station 105-*e* may be found in a UE 115 by operating according to D2D operations.

The receiver 905-*a* may receive information which may be passed on to base station CRS based PDCCH module 910-*a*, and to other components of base station 105-*e*. The base station CRS based PDCCH module 910-*a* may perform the operations described above with reference to FIG. 9. The transmitter 915-*a* may transmit signals received from other components of base station 105-*e*.

The BS narrowband connection module 1005 may establish a connection with a UE 115, where the connection may include a narrowband control region as described above with reference to FIGS. 2-4.

The BS resource identification module 1010 may identify a set of resources for the UE 115 in the narrowband control region based at least in part on a resource element indexing configuration associated with a CRS based demodulation scheme as described above with reference to FIGS. 2-4.

The PDCCH module 1015 may transmit a PDCCH to the UE 115 using the set of resources as described above with reference to FIGS. 2-4.

The CRS module 1020 may transmit a CRS in a same resource block as the set of resources as described above with reference to FIGS. 2-4. In some examples, the CRS demodulation scheme may be based on a CRS configuration comprising a maximum number of CRS ports.

Figure 11:
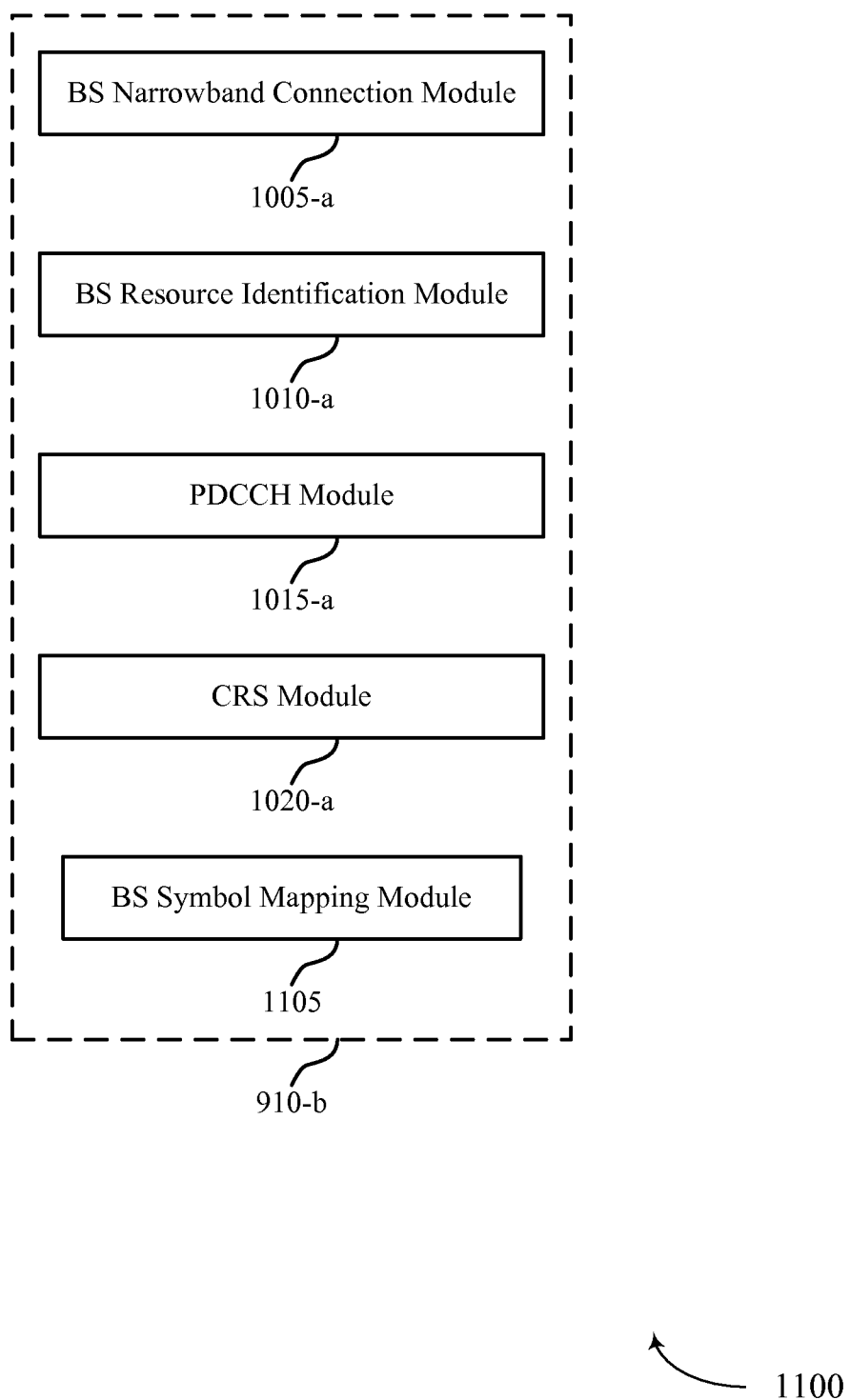
FIG. 11 shows a block diagram of a base station configured for narrowband control channel decoding in accordance with various aspects of the present disclosure.

FIG. 11 shows a block diagram 1100 of a base station CRS based PDCCH module 910-b for narrowband control channel decoding in accordance with various aspects of the present disclosure. The base station CRS based PDCCH module 910-b may be an example of aspects of a base station CRS based PDCCH module 910 described with reference to FIGS. 9-10. The base station CRS based PDCCH module 910-b may include a BS narrowband connection module 1005-a, a BS resource identification module 1010-a, a PDCCH module 1015-a, and a CRS module 1020-a. Each of these modules may perform the functions described above with reference to FIG. 10. The base station CRS based PDCCH module 910-b may also include and a BS symbol mapping module 1105.

The BS symbol mapping module 1105 may map a set of modulation symbols to the set of resources, where the mapping excludes a broadband control region from the set as described above with reference to FIGS. 2-4.

The components of base station 105-d, base station 105-e, or base station CRS based PDCCH module 910-b may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 12:
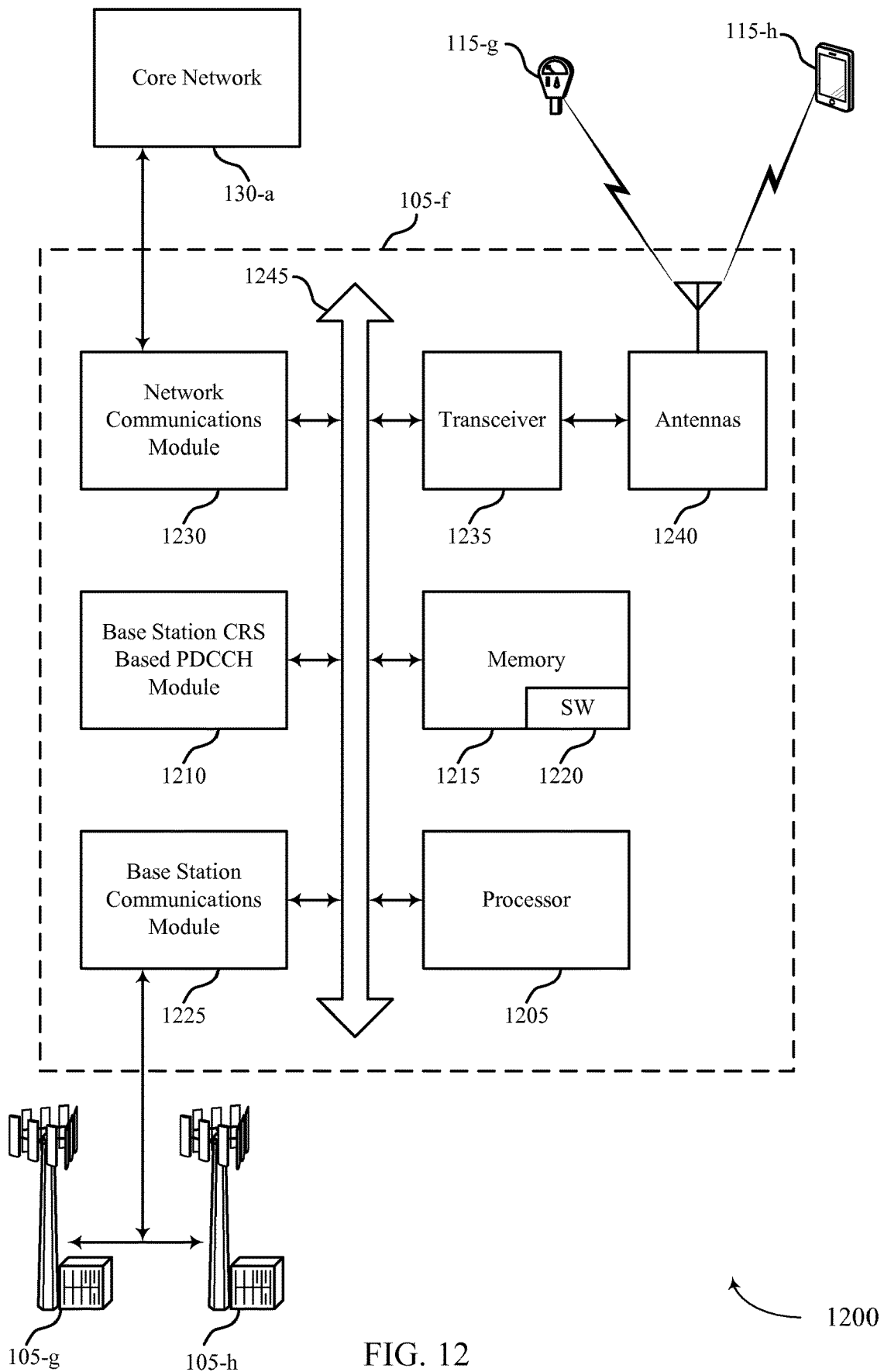
FIG. 12 illustrates a block diagram of a system including a base station configured for narrowband control channel decoding in accordance with various aspects of the present disclosure.

FIG. 12 shows a diagram of a system 1200 including a base station 105 configured for narrowband control channel decoding in accordance with various aspects of the present disclosure. System 1200 may include base station 105-f, which may be an example of a base station 105 described above with reference to FIGS. 1-11. Base station 105-f may include a base station CRS based PDCCH module 1210, which may be an example of a base station CRS based PDCCH module 910 described with reference to FIGS. 9-11. Base station 105-f may also include components for bi-directional voice and data communications including components for transmitting communications and components for receiving communications. For example, base station 105-f may communicate bi-directionally with base station 105-g or base station 105-h.

In some cases, base station 105-f may have one or more wired backhaul links. Base station 105-f may have a wired backhaul link (e.g., S1 interface, etc.) to the core network 130. Base station 105-f may also communicate with other base stations 105, such as base station 105-g and base station 105-h via inter-base station backhaul links (e.g., an X2 interface). Each of the base stations 105 may communicate with UEs 115 using the same or different wireless communications technologies. In some cases, base station 105-f may communicate with other base stations such as 105-g or 105-h utilizing base station communication module 1225. In some embodiments, base station communication module 1225 may provide an X2 interface within an LTE/LTE-A wireless communication network technology to provide communication between some of the base stations 105. In some embodiments, base station 105-f may communicate with other base stations through core network 130. In some cases, base station 105-f may communicate with the core network 130 through network communications module 1230.

Base station 105-f may include a processor module 1205, memory 1215 (including software (SW) 1220), transceiver modules 1235, and antenna(s) 1240, which each may be in communication, directly or indirectly, with one another (e.g., over bus system 1245). The transceiver modules 1235 may be configured to communicate bi-directionally, via the antenna(s) 1240, with the UEs 115, which may be multi-mode devices. The transceiver module 1235 (or other components of the base station 105-f) may also be configured to communicate bi-directionally, via the antennas 1240, with one or more other base stations (not shown). The transceiver module 1235 may include a modem configured to modulate the packets and provide the modulated packets to the antennas 1240 for transmission, and to demodulate packets received from the antennas 1240. The base station 105-f may include multiple transceiver modules 1235, each with one or more associated antennas 1240. The transceiver module may be an example of a combined receiver 905 and transmitter 915 of FIG. 9.

The memory 1215 may include RAM and ROM. The memory 1215 may also store computer-readable, computer-executable software code 1220 containing instructions that are configured to, when executed, cause the processor module 1210 to perform various functions described herein (e.g., a CRS based control channel element, selecting coverage enhancement techniques, call processing, database management, message routing, etc.). Alternatively, the software 1220 may not be directly executable by the processor module 1205 but be configured to cause the computer, (e.g., when compiled and executed), to perform functions described herein. The processor module 1205 may include an intelligent hardware device, (e.g., a CPU, a microcontroller, an ASIC, etc.). The processor module 1205 may include various special purpose processors such as encoders, queue processing modules, base band processors, radio head controllers, digital signal processor (DSPs), and the like.

The base station communications module 1225 may manage communications with other base stations 105. The communications management module may include a controller or scheduler for controlling communications with UEs 115 in cooperation with other base stations 105. For example, the base station communications module 1225 may coordinate scheduling for transmissions to UEs 115 for various interference mitigation techniques such as beam-forming or joint transmission.

Figure 13:
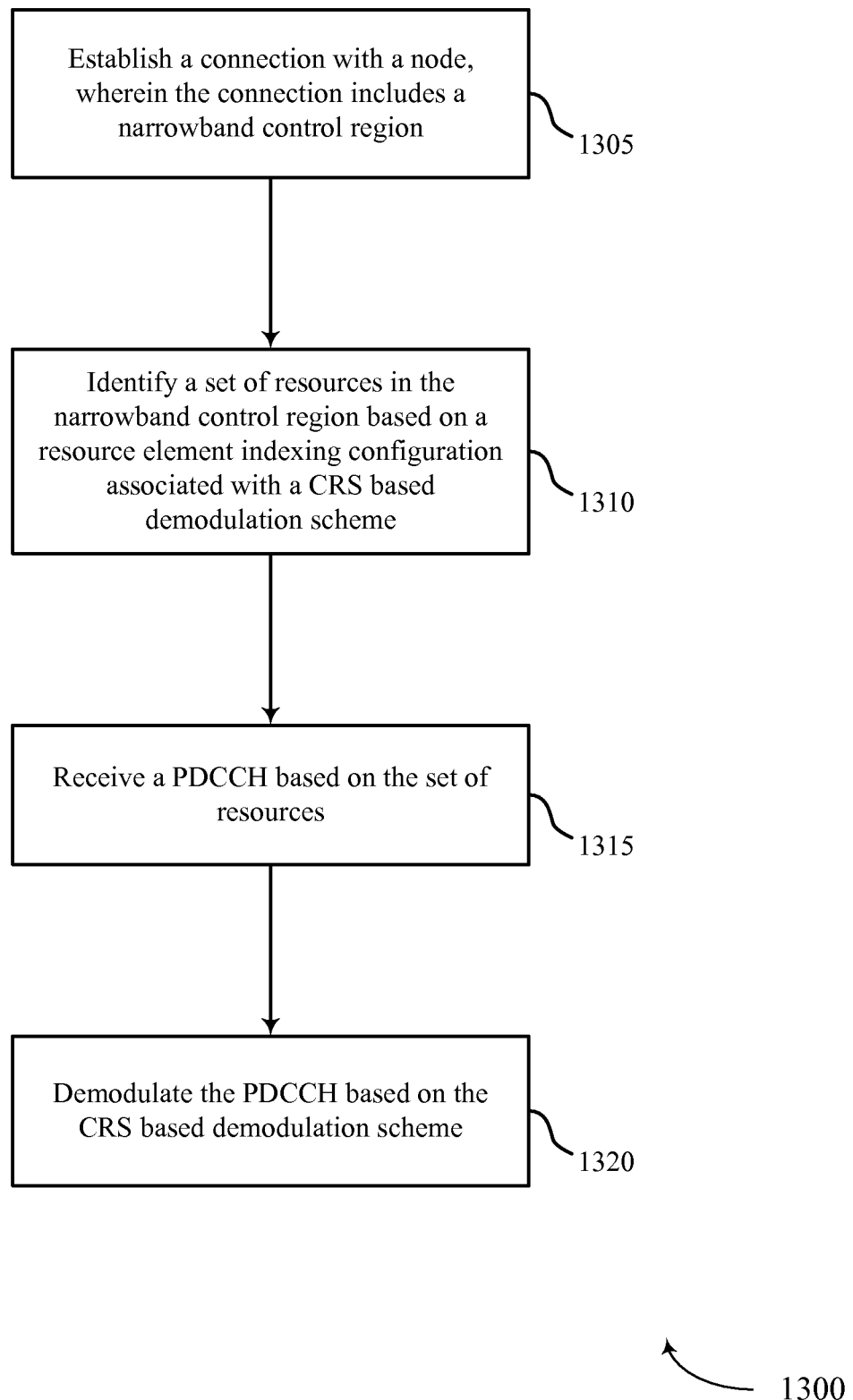
FIG. 13 shows a flowchart illustrating a method for narrowband control channel decoding in accordance with various aspects of the present disclosure.

FIG. 13 shows a flowchart illustrating a method 1300 for narrowband control channel decoding in accordance with various aspects of the present disclosure. The operations of method 1300 may be implemented by a UE 115 or its components as described with reference to FIGS. 1-12. For example, the operations of method 1300 may be performed by the CRS based PDCCH module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 1305, the UE 115 may establish a connection with a node (such as a UE 115 or base station 105), where the connection may include a narrowband control region as described above with reference to FIGS. 2-4. In certain examples, the operations of block 1305 may be performed by the narrowband connection module 605 as described above with reference to FIG. 6.

At block 1310, the UE 115 may identify a set of resources in the narrowband control region based at least in part on a resource element indexing configuration associated with a CRS based demodulation scheme as described above with reference to FIGS. 2-4. In certain examples, the operations of block 1310 may be performed by the resource identification module 610 as described above with reference to FIG. 6.

At block 1315, the UE 115 may receive a PDCCH based on the set of resources as described above with reference to FIGS. 2-4. In certain examples, the operations of block 1315 may be performed by the receiver 505 as described above with reference to FIG. 5.

At block 1320, the UE 115 may demodulate the PDCCH based at least in part on a CRS as described above with reference to FIGS. 2-4. In certain examples, the operations of block 1320 may be performed by the demodulation module 615 as described above with reference to FIG. 6.

Figure 14:
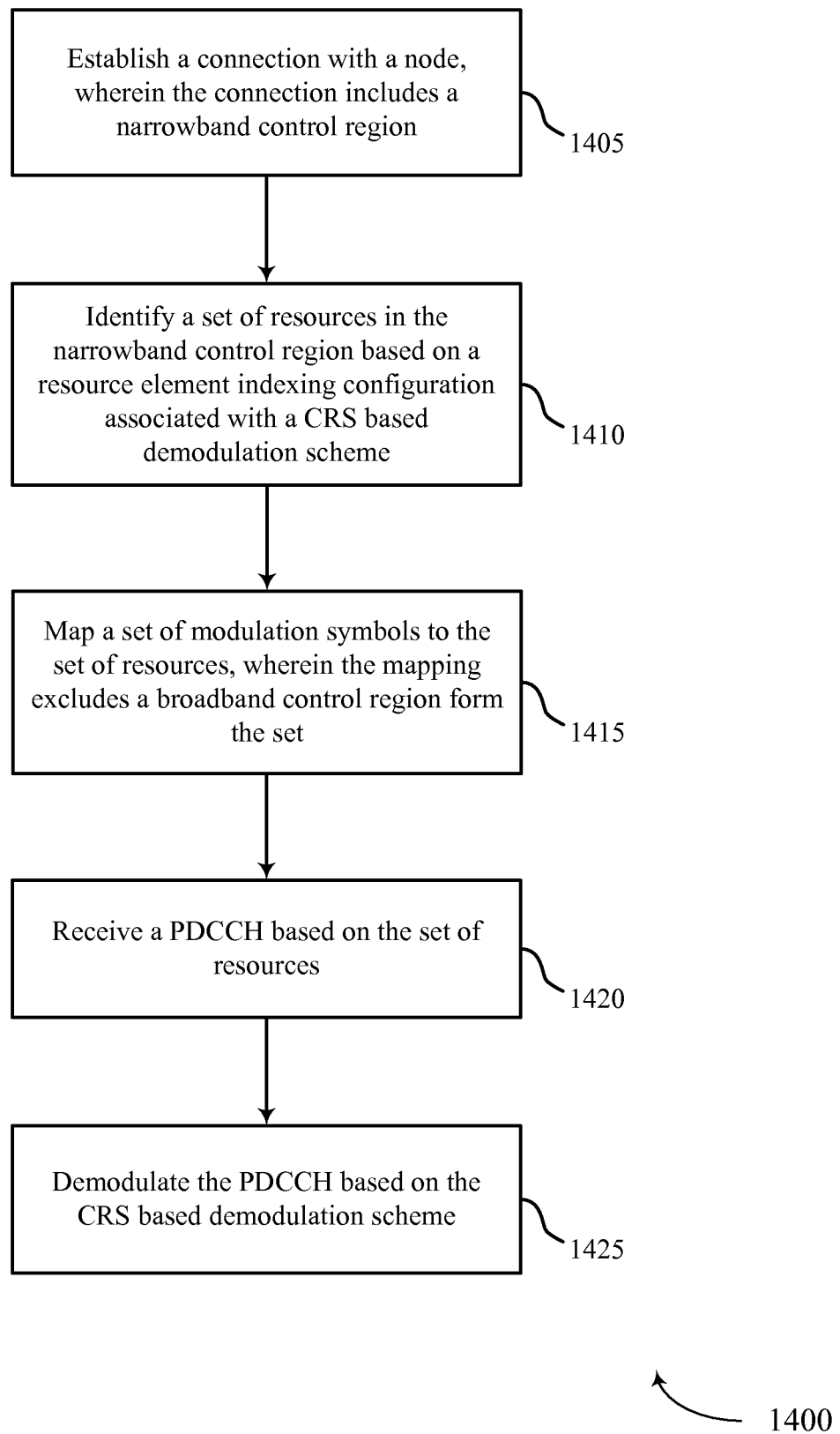
FIG. 14 shows a flowchart illustrating a method for narrowband control channel decoding in accordance with various aspects of the present disclosure.

FIG. 14 shows a flowchart illustrating a method 1400 for narrowband control channel decoding in accordance with various aspects of the present disclosure. The operations of method 1400 may be implemented by a UE 115 or its components as described with reference to FIGS. 1-12. For example, the operations of method 1400 may be performed by the CRS based PDCCH module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of method 1300 of FIG. 13.

At block 1405, the UE 115 may establish a connection with a node (such as a UE 115 or base station 105), where the connection may include a narrowband control region as described above with reference to FIGS. 2-4. In certain examples, the operations of block 1405 may be performed by the narrowband connection module 605 as described above with reference to FIG. 6.

At block 1410, the UE 115 may identify a set of resources in the narrowband control region based at least in part on a resource element indexing configuration associated with a CRS based demodulation scheme as described above with reference to FIGS. 2-4. In certain examples, the operations of block 1410 may be performed by the resource identification module 610 as described above with reference to FIG. 6.

At block 1415, the UE 115 may map a set of modulation symbols to the set of resources, where the mapping excludes a broadband control region from the set as described above with reference to FIGS. 2-4. In certain examples, the operations of block 1415 may be performed by the symbol mapping module 710 as described above with reference to FIG. 7.

At block 1420, the UE 115 may receive a PDCCH based on the set of resources as described above with reference to FIGS. 2-4. In certain examples, the operations of block 1420 may be performed by the receiver 505 as described above with reference to FIG. 5.

At block 1425, the UE 115 may demodulate the PDCCH based at least in part on a CRS as described above with reference to FIGS. 2-4. In certain examples, the operations of block 1425 may be performed by the demodulation module 615 as described above with reference to FIG. 6.

Figure 15:
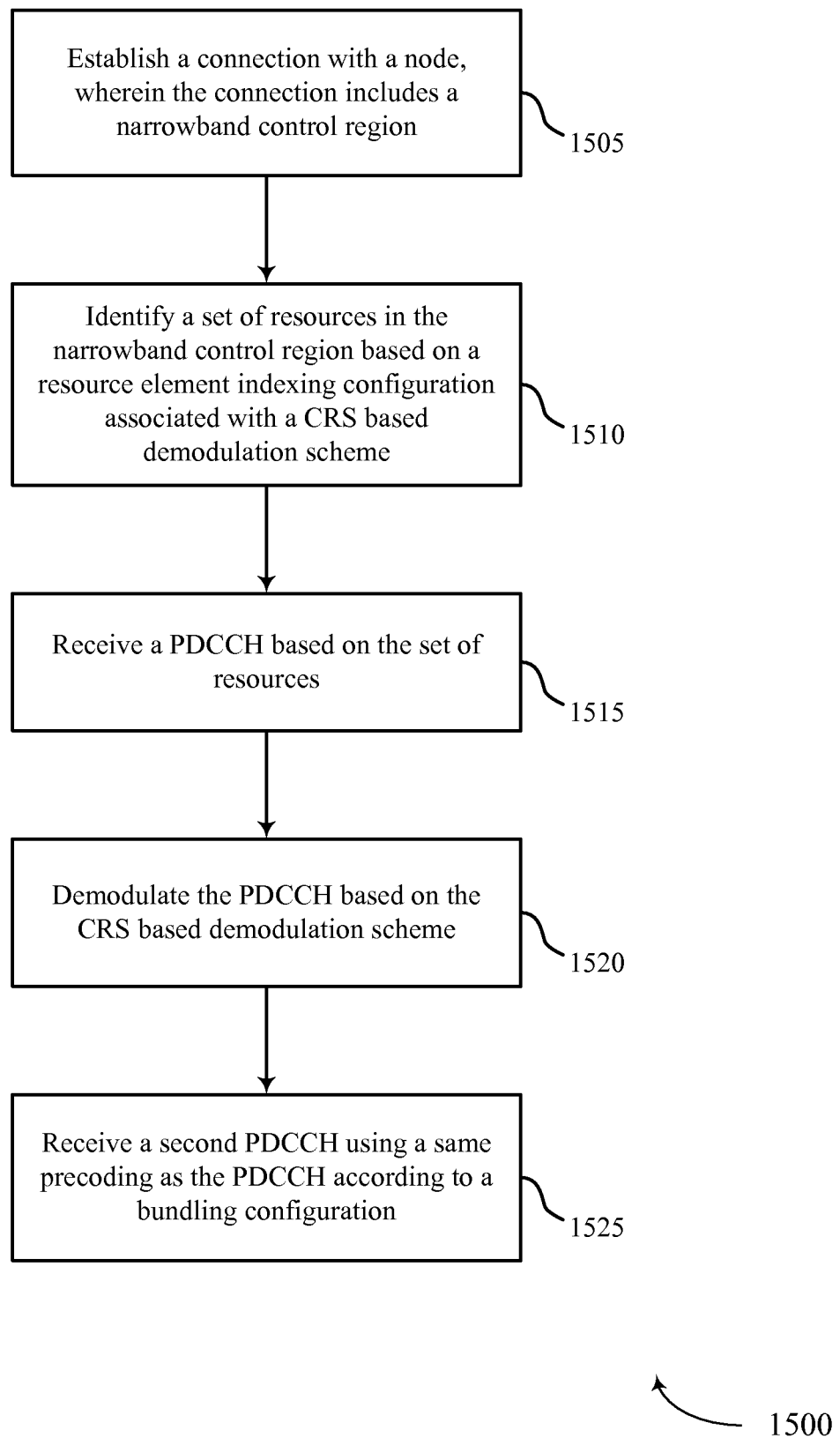
FIG. 15 shows a flowchart illustrating a method for narrowband control channel decoding in accordance with various aspects of the present disclosure.

FIG. 15 shows a flowchart illustrating a method 1500 for narrowband control channel decoding in accordance with various aspects of the present disclosure. The operations of method 1500 may be implemented by a UE 115 or its components as described with reference to FIGS. 1-12. For example, the operations of method 1500 may be performed by the CRS based PDCCH module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1300, and 1400 of FIG. 13 or 14.

At block 1505, the UE 115 may establish a connection with a node (such as a UE 115 or base station 105), where the connection may include a narrowband control region as described above with reference to FIGS. 2-4. In certain examples, the operations of block 1505 may be performed by the narrowband connection module 605 as described above with reference to FIG. 6.

At block 1510, the UE 115 may identify a set of resources in the narrowband control region based at least in part on a resource element indexing configuration associated with a CRS based demodulation scheme as described above with reference to FIGS. 2-4. In certain examples, the operations of block 1510 may be performed by the resource identification module 610 as described above with reference to FIG. 6.

At block 1515, the UE 115 may receive a PDCCH based on the set of resources as described above with reference to FIGS. 2-4. In certain examples, the operations of block 1515 may be performed by the receiver 505 as described above with reference to FIG. 5.

At block 1520, the UE 115 may demodulate the PDCCH based at least in part on a CRS as described above with reference to FIGS. 2-4. In certain examples, the operations of block 1520 may be performed by the demodulation module 615 as described above with reference to FIG. 6.

At block 1525, the UE 115 may receive a second PDCCH using a same precoding as the PDCCH according to a bundling configuration or a different precoding from the PDCCH according to a predetermined precoding pattern as described above with reference to FIGS. 2-4. In certain examples, the operations of block 1525 may be performed by the receiver 505 as described above with reference to FIG. 5.

Figure 16:
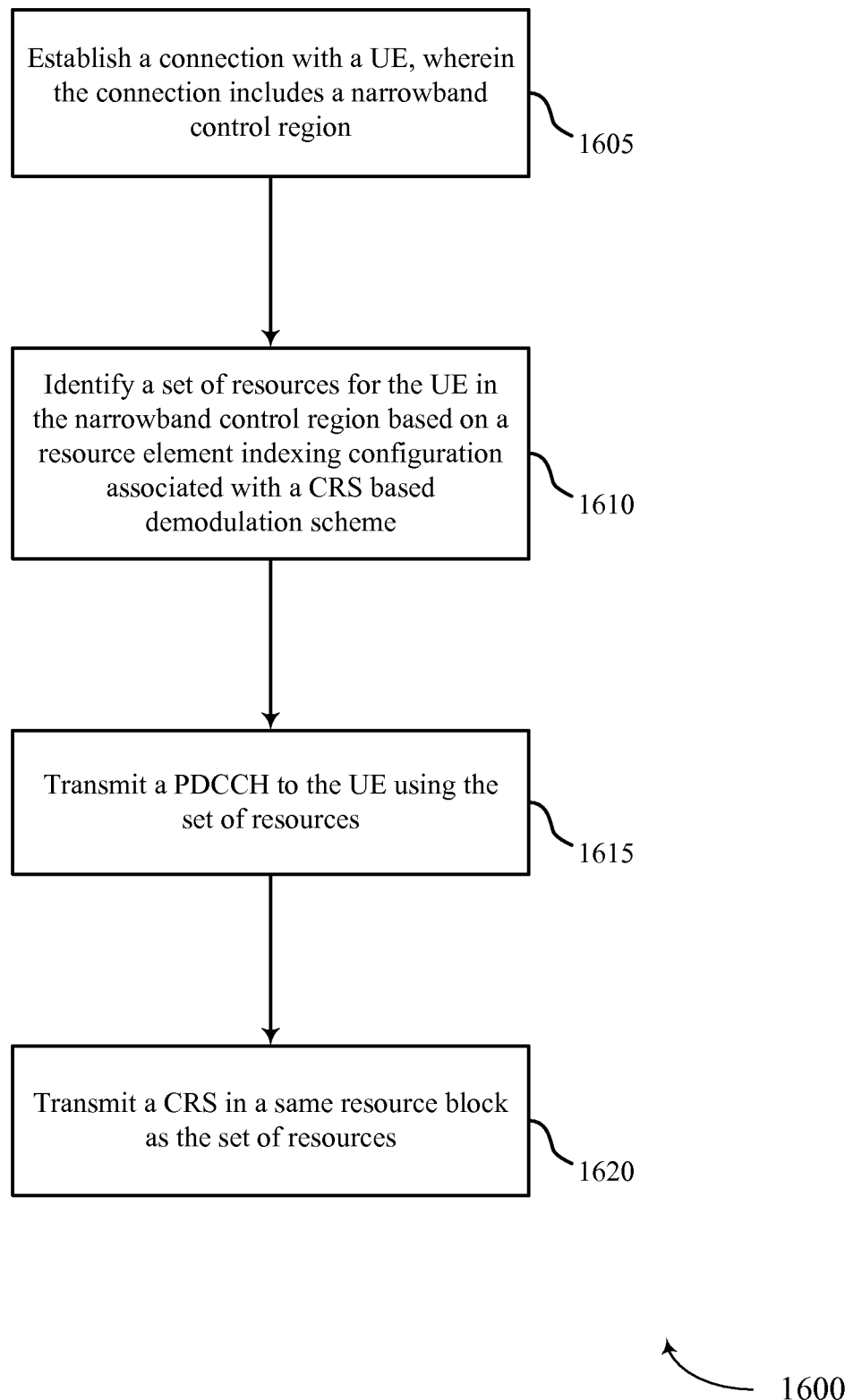
FIG. 16 shows a flowchart illustrating a method for narrowband control channel decoding in accordance with various aspects of the present disclosure.

FIG. 16 shows a flowchart illustrating a method 1600 for narrowband control channel decoding in accordance with various aspects of the present disclosure. The operations of method 1600 may be implemented by a wireless node such as a base station 105 or a UE 115 (e.g., in operating in D2D mode) or its components as described with reference to FIGS. 1-12. For example, the operations of method 1600 may be performed by the base station CRS based PDCCH module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware.

At block 1605, the wireless node may establish a connection with a UE, where the connection may include a narrowband control region as described above with reference to FIGS. 2-4. In certain examples, the operations of block 1605 may be performed by the BS narrowband connection module 1005 as described above with reference to FIG. 1.

At block 1610, the wireless node may identify a set of resources for the UE in the narrowband control region based at least in part on a resource element indexing configuration associated with a CRS based demodulation scheme as described above with reference to FIGS. 2-4. In certain examples, the operations of block 1610 may be performed by the BS resource identification module 1010 as described above with reference to FIG. 1.

At block 1615, the wireless node may transmit a PDCCH to the UE using the set of resources as described above with reference to FIGS. 2-4. In certain examples, the operations of block 1615 may be performed by the PDCCH module 1015 as described above with reference to FIG. 1.

At block 1620, the wireless node may transmit a CRS in a same resource block as the set of resources as described above with reference to FIGS. 2-4. In certain examples, the operations of block 1620 may be performed by the CRS module 1020 as described above with reference to FIG. 1.

Figure 17:
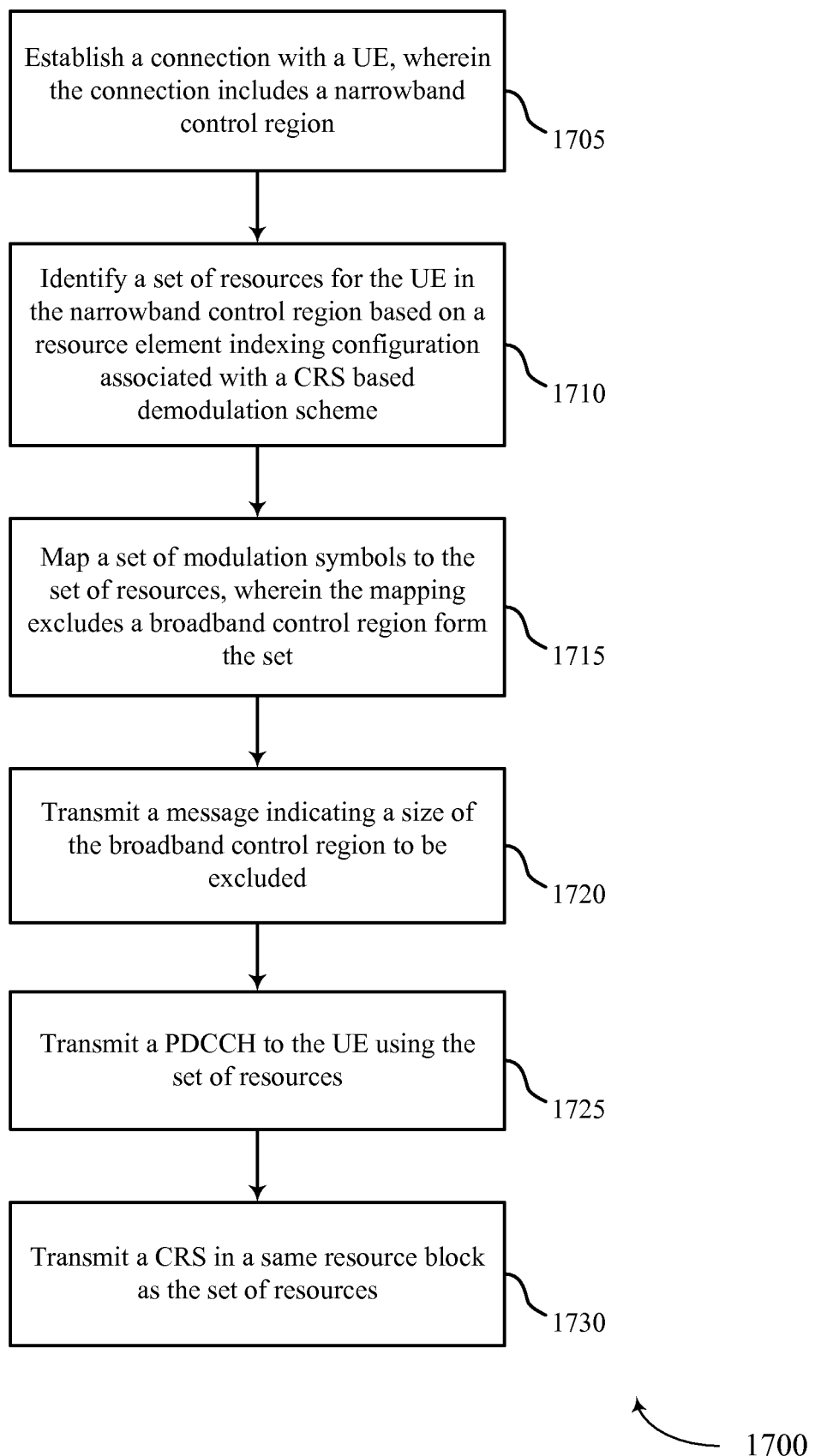
FIG. 17 shows a flowchart illustrating a method for narrowband control channel decoding in accordance with various aspects of the present disclosure.

FIG. 17 shows a flowchart illustrating a method 1700 for narrowband control channel decoding in accordance with various aspects of the present disclosure. The operations of method 1700 may be implemented by a wireless node such as a base station 105 or a UE 115 (e.g., in operating in D2D mode) or its components as described with reference to FIGS. 1-12. For example, the operations of method 1700 may be performed by the base station CRS based PDCCH module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1700 may also incorporate aspects of method 1600 of FIG. 16.

At block 1705, the wireless node may establish a connection with a UE, where the connection may include a narrowband control region as described above with reference to FIGS. 2-4. In certain examples, the operations of block 1705 may be performed by the BS narrowband connection module 1005 as described above with reference to FIG. 1.

At block 1710, the wireless node may identify a set of resources for the UE in the narrowband control region based at least in part on a resource element indexing configuration associated with a CRS based demodulation scheme as described above with reference to FIGS. 2-4. In certain examples, the operations of block 1710 may be performed by the BS resource identification module 1010 as described above with reference to FIG. 1.

At block 1715, the wireless node may map a set of modulation symbols to the set of resources, where the mapping excludes a broadband control region from the set as described above with reference to FIGS. 2-4. In certain examples, the operations of block 1715 may be performed by the symbol mapping module 710 as described above with reference to FIG. 7.

At block 1720, the wireless node may transmit a message indicating a size of the broadband control region to be excluded as described above with reference to FIGS. 2-4. In certain examples, the operations of block 1720 may be performed by the transmitter 915 as described above with reference to FIG. 9.

At block 1725, the wireless node may transmit a PDCCH to the UE using the set of resources as described above with reference to FIGS. 2-4. In certain examples, the operations of block 1725 may be performed by the PDCCH module 1015 as described above with reference to FIG. 1.

At block 1730, the wireless node may transmit a CRS in a same resource block as the set of resources as described above with reference to FIGS. 2-4. In certain examples, the operations of block 1730 may be performed by the CRS module 1020 as described above with reference to FIG. 1.

Figure 18:
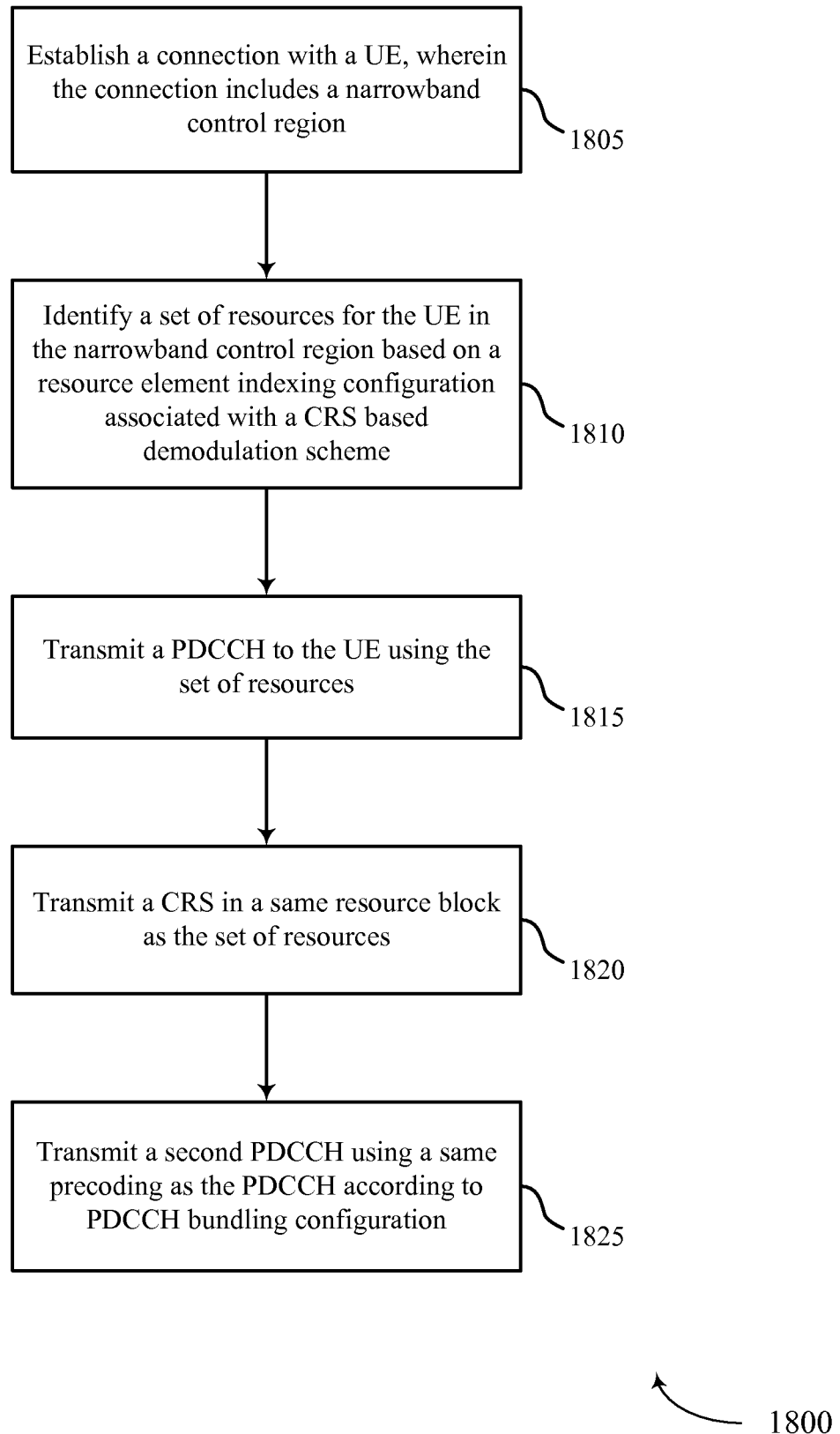
FIG. 18 shows a flowchart illustrating a method for narrowband control channel decoding in accordance with various aspects of the present disclosure.

FIG. 18 shows a flowchart illustrating a method 1800 for narrowband control channel decoding in accordance with various aspects of the present disclosure. The operations of method 1800 may be implemented by a wireless node such as a base station 105 or a UE 115 (e.g., in operating in D2D mode) or its components as described with reference to FIGS. 1-12. For example, the operations of method 1800 may be performed by the base station CRS based PDCCH module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1800 may also incorporate aspects of methods 1600, and 1700 of FIG. 16 or 17.

At block 1805, the wireless node may establish a connection with a UE, where the connection may include a narrowband control region as described above with reference to FIGS. 2-4. In certain examples, the operations of block 1805 may be performed by the BS narrowband connection module 1005 as described above with reference to FIG. 1.

At block 1810, the wireless node may identify a set of resources for the UE in the narrowband control region based at least in part on a resource element indexing configuration associated with a CRS based demodulation scheme as described above with reference to FIGS. 2-4. In certain examples, the operations of block 1810 may be performed by the BS resource identification module 1010 as described above with reference to FIG. 1.

At block 1815, the wireless node may transmit a PDCCH to the UE using the set of resources as described above with reference to FIGS. 2-4. In certain examples, the operations of block 1815 may be performed by the PDCCH module 1015 as described above with reference to FIG. 1.

At block 1820, the wireless node may transmit a CRS in a same resource block as the set of resources as described above with reference to FIGS. 2-4. In certain examples, the operations of block 1820 may be performed by the CRS module 1020 as described above with reference to FIG. 1.

At block 1825, the wireless node may transmit a second PDCCH using a same precoding as the PDCCH according to PDCCH bundling configuration or a different precoding from the PDCCH according to a predetermined precoding pattern as described above with reference to FIGS. 2-4. In certain examples, the operations of block 1825 may be performed by the transmitter 915 as described above with reference to FIG. 9.

Figure 19:
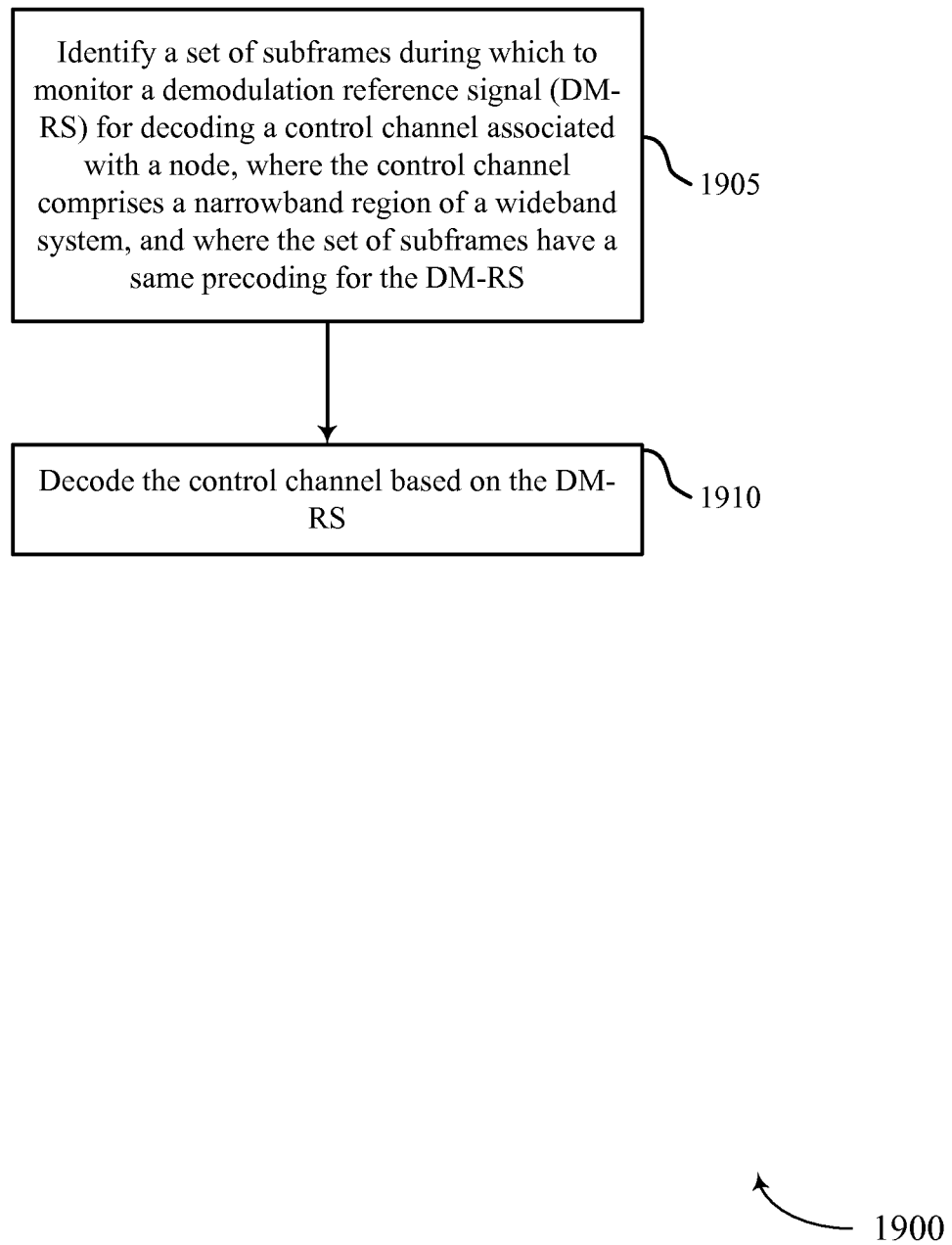
FIG. 19 shows a flowchart illustrating a method for narrowband control channel decoding in accordance with various aspects of the present disclosure.

FIG. 19 shows a flowchart illustrating a method 1900 for narrowband control channel decoding in accordance with various aspects of the present disclosure. The operations of method 1900 may be implemented by a wireless node such as a base station 105 or a UE 115 or its components as described with reference to FIGS. 1-12. For example, the operations of method 1900 may be performed by the CRS based PDCCH module 510 as described with reference to FIGS. 5-8. In some examples, a UE 115 may execute a set of codes to control the functional elements of the UE 115 to perform the functions described below. Additionally or alternatively, the UE 115 may perform aspects of the functions described below using special-purpose hardware.

At block 1905, the UE 115 may identify a set of subframes during which to monitor a demodulation reference signal (DM-RS) for decoding a control channel associated with a node, where the control channel comprises a narrowband region of a wideband system, and where the set of subframes have a same precoding for the DM-RS as described above with reference to FIGS. 2-4. In certain examples, the operations of block 1905 may be performed by the resource identification module 610 as described with reference to FIGS. 6 and 7.

At block 1910, the UE 115 may decode the control channel based on the DM-RS as described above with reference to FIGS. 2-4. In certain examples, the operations of block 1910 may be performed by the demodulation module 615 as described with reference to FIGS. 6-7, or the DM-RS module 705 as described with reference to FIG. 7.

Figure 20:
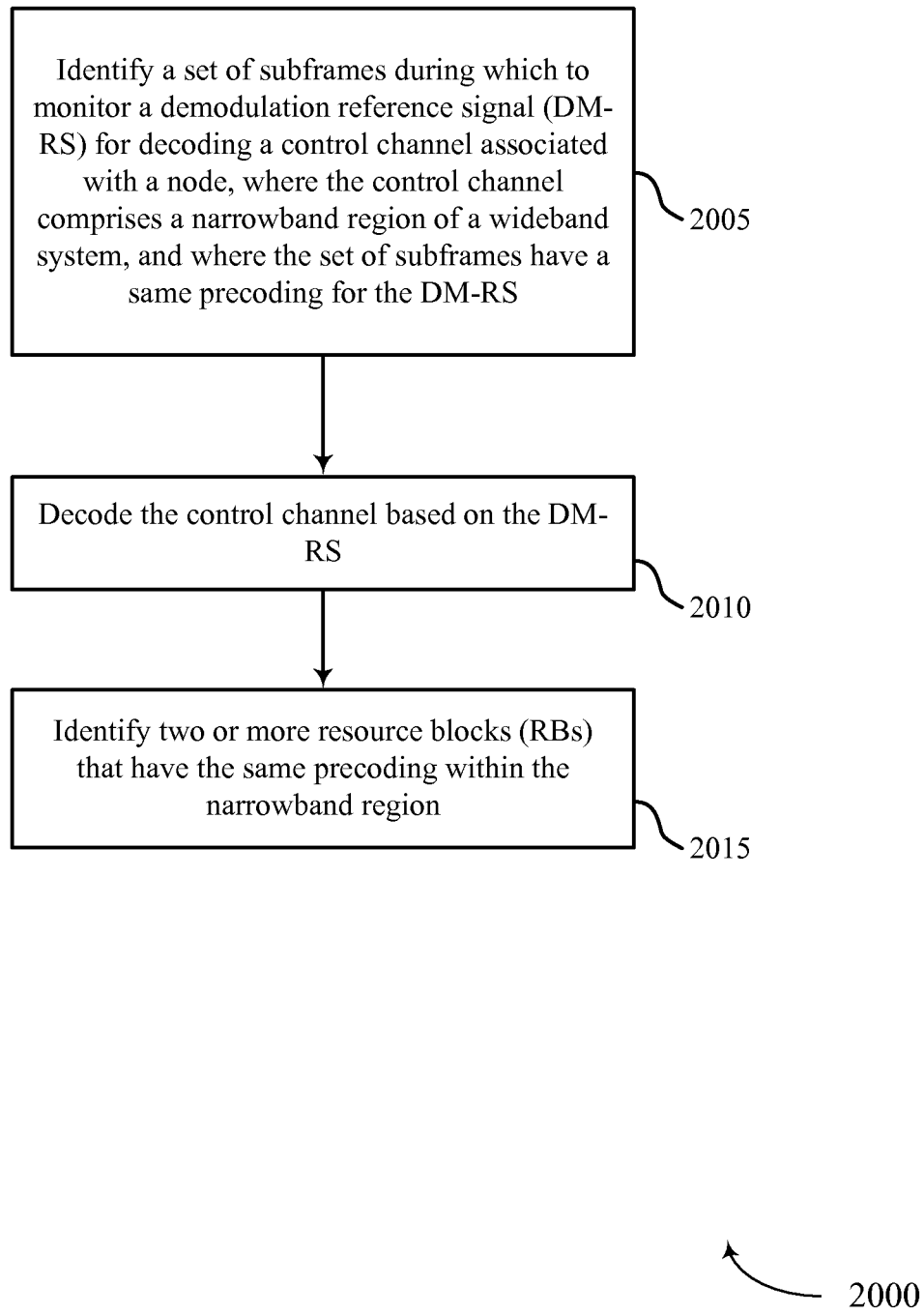
FIG. 20 shows a flowchart illustrating a method for narrowband control channel decoding in accordance with various aspects of the present disclosure.

FIG. 20 shows a flowchart illustrating a method 2000 for narrowband control channel decoding in accordance with various aspects of the present disclosure. The operations of method 2000 may be implemented by a UE 115 or its components as described with reference to FIGS. 1-12. For example, the operations of method 2000 may be performed by the CRS based PDCCH module 510 as described with reference to FIGS. 5-8. In some examples, the UE 115 may execute a set of codes to control the functional elements of the UE 115 to perform the functions described below. Additionally or alternatively, the UE 115 may perform aspects of the functions described below using special-purpose hardware.

At block 2005, the UE 115 may identify a set of subframes during which to monitor a demodulation reference signal (DM-RS) for decoding a control channel associated with a node, where the control channel comprises a narrowband region of a wideband system, and where the set of subframes have a same precoding for the DM-RS as described above with reference to FIGS. 2-4. In certain examples, the operations of block 2005 may be performed by the resource identification module 610 as described with reference to FIGS. 6 and 7.

At block 2010, the UE 115 may decode the control channel based on the DM-RS as described above with reference to FIGS. 2-4. In certain examples, the operations of block 2010 may be performed by the demodulation module 615 as described with reference to FIGS. 6-7, or the DM-RS module 705 as described with reference to FIG. 7.

At block 2015, the UE 115 may identify two or more resource blocks (RBs) that have the same precoding within the narrowband region as described above with reference to FIGS. 2-4. In certain examples, the operations of block 2015 may be performed by the resource identification module 610 as described with reference to FIGS. 6 and 7.

Figure 21:
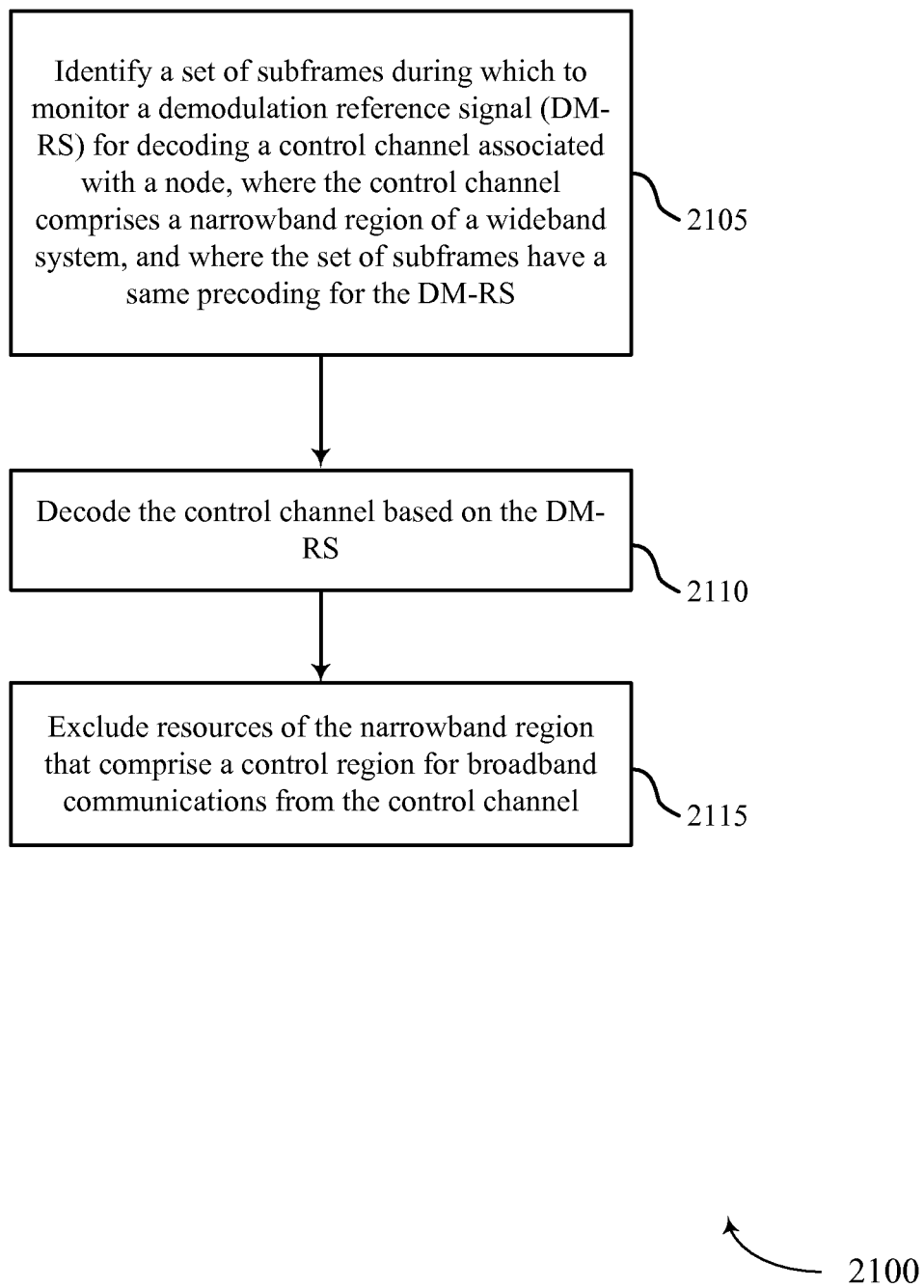
FIG. 21 shows a flowchart illustrating a method for narrowband control channel decoding in accordance with various aspects of the present disclosure.

FIG. 21 shows a flowchart illustrating a method 2100 for narrowband control channel decoding in accordance with various aspects of the present disclosure. The operations of method 2100 may be implemented by a UE 115 or its components as described with reference to FIGS. 1-12. For example, the operations of method 2100 may be performed by the CRS based PDCCH module 510 as described with reference to FIGS. 5-8. In some examples, the UE 115 may execute a set of codes to control the functional elements of the UE 115 to perform the functions described below. Additionally or alternatively, the UE 115 may perform aspects of the functions described below using special-purpose hardware.

At block 2105, the UE 115 may identify a set of subframes during which to monitor a demodulation reference signal (DM-RS) for decoding a control channel associated with a node, where the control channel comprises a narrowband region of a wideband system, and where the set of subframes have a same precoding for the DM-RS as described above with reference to FIGS. 2-4. In certain examples, the operations of block 2105 may be performed by the resource identification module 610 as described with reference to FIGS. 6 and 7.

At block 2110, the UE 115 may decode the control channel based on the DM-RS as described above with reference to FIGS. 2-4. In certain examples, the operations of block 2110 may be performed by the demodulation module 615 as described with reference to FIGS. 6-7, or the DM-RS module 705 as described with reference to FIG. 7.

At block 2115, the UE 115 may exclude resources of the narrowband region that comprise a control region for broadband communications from the control channel as described above with reference to FIGS. 2-4. In certain examples, the operations of block 2115 may be performed by the narrowband connection module 605 or the resource identification module 610 as described with reference to FIGS. 6-7.

Thus, methods 1300, 1400, 1500, 1600, 1700, 1800, 1900, 2000, and 2100 may provide for narrowband control channel decoding. It should be noted that methods 1300, 1400, 1500, 1600, 1700, 1800, 1900, 2000, and 2100 describe possible implementation, and that the operations and the steps may be rearranged or otherwise modified such that other implementations are possible. In some examples, aspects from two or more of the methods 1300, 1400, 1500, 1600, 1700, 1800, 1900, 2000, and 2100 may be combined.

The detailed description set forth above in connection with the appended drawings describes example embodiments and does not represent all the embodiments that may be implemented or that are within the scope of the claims. The term "exemplary," which may be used in this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication at a user equipment (UE), comprising:
  receiving a configuration for resources of a control channel associated with a node, wherein the resources are included in a narrowband region of a wideband system;
  excluding, based at least in part on a message received from a base station, resources of the narrowband region that comprise a control region for broadband communications from the control channel;
  identifying a plurality of subframes during which to monitor a demodulation reference signal (DM-RS) for decoding the resources of the control channel, wherein the plurality of subframes have a same precoding applied to the DM-RS across the plurality of subframes; and
  decoding the control channel based at least in part on the DM-RS.

2. The method of claim 1, further comprising:
  identifying two or more resource blocks (RBs) that have the same precoding within the narrowband region.

3. The method of claim 1, further comprising:
  receiving the message indicating the resources of the narrowband region that comprise the control region for broadband communications; and
  determining the resources of the narrowband region that comprise the control region for the broadband communications based at least in part on the message.

4. The method of claim 1, wherein the control channel comprises a control channel element (CCE) that comprises a set of resource element groups (REGs).

5. The method of claim 4, wherein each REG of the set of REGs is distributed in time and frequency during the plurality of subframes within the narrowband region.

6. The method of claim 4, wherein each REG of the set of REGs excludes resource elements that comprise DM-RS.

7. The method of claim 6, wherein each REG of the set of REGs excludes resource elements that comprise a cell-specific reference signal (CRS).

8. The method of claim 1, wherein a single precoder is applied for each physical resource block pair of the control channel.

9. The method of claim 1, wherein two or more precoders are applied to resources with each physical resource block pair of the control channel.

10. The method of claim 1, wherein the control channel is decoded based at least in part on a cell-specific reference signal (CRS).

11. An apparatus for wireless communication, comprising:
a processor;
memory coupled with the processor; and
instructions stored in the memory and operable, when executed by the processor, to cause the apparatus to:
receive a configuration for resources of a control channel associated with a node, wherein the resources are included in a narrowband region of a wideband system;
exclude, based at least in part on a message received from a base station, resources of the narrowband region that comprise a control region for broadband communications from the control channel;
identify a plurality of subframes during which to monitor a demodulation reference signal (DM-RS) for decoding the resources of the control channel, wherein the plurality of subframes have a same precoding applied to the DM-RS across the plurality of subframes; and
decode the control channel based at least in part on the DM-RS.

12. The apparatus of claim 11, wherein the instructions are operable to cause the processor to:
identify two or more resource blocks (RBs) that have the same precoding within the narrowband region.

13. The apparatus of claim 11, wherein the instructions are operable to cause the processor to:
receive the message indicating the resources of the narrowband region that comprise the control region for broadband communications; and
determine the resources of the narrowband region that comprise the control region for the broadband communications based at least in part on the message.

14. The apparatus of claim 11, wherein the control channel comprises a control channel element (CCE) that comprises a set of resource element groups (REGs).

15. The apparatus of claim 14, wherein each REG of the set of REGs is distributed in time and frequency during the plurality of subframes within the narrowband region.

16. The apparatus of claim 11, wherein a single precoder is applied for each physical resource block pair of the control channel.

17. The apparatus of claim 11, wherein two or more precoders are applied to resources with each physical resource block pair of the control channel.

18. The apparatus of claim 11, wherein the control channel is decoded based at least in part on a cell-specific reference signal (CRS).

19. An apparatus for wireless communication comprising:
means for receiving a configuration for resources of a control channel associated with a node, wherein the resources are included in a narrowband region of a wideband system;
means for excluding, based at least in part on a message received from a base station, resources of the narrowband region that comprise a control region for broadband communications from the control channel;
means for identifying a plurality of subframes during which to monitor a demodulation reference signal (DM-RS) for decoding the resources of the control channel, wherein the plurality of subframes have a same precoding applied to the DM-RS across the plurality of subframes; and
means for decoding the control channel based at least in part on the DM-RS.

20. The apparatus of claim 19, further comprising:
means for identifying two or more resource blocks (RBs) that have the same precoding within the narrowband region.

21. The apparatus of claim 19, further comprising:
means for receiving the message indicating the resources of the narrowband region that comprise the control region for broadband communications; and
means for determining the resources of the narrowband region that comprise the control region for the broadband communications based at least in part on the message.

22. The apparatus of claim 19, wherein the control channel comprises a control channel element (CCE) that comprises a set of resource element groups (REGs).

23. The apparatus of claim 22, wherein each REG of the set of REGs excludes resource elements that comprise DM-RS.

24. The apparatus of claim 19, wherein a single precoder is applied for each physical resource block pair of the control channel.

25. The apparatus of claim 19, wherein two or more precoders are applied to resources with each physical resource block pair of the control channel.

26. The apparatus of claim 19, wherein the control channel is decoded based at least in part on a cell-specific reference signal (CRS).

27. A non-transitory computer-readable medium storing code for wireless communication, the code comprising instructions executable to:
receive a configuration for resources of a control channel associated with a node, wherein the resources are included in a narrowband region of a wideband system;
exclude, based at least in part on a message received from a base station, resources of the narrowband region that comprise a control region for broadband communications from the control channel;
identify a plurality of subframes during which to monitor a demodulation reference signal (DM-RS) for decoding the resources of the control channel, wherein the plurality of subframes have a same precoding applied to the DM-RS across the plurality of subframes; and
decode the control channel based at least in part on the DM-RS.

* * * * *